US010251144B2

(12) United States Patent
Blaser et al.

(10) Patent No.: US 10,251,144 B2
(45) Date of Patent: Apr. 2, 2019

(54) LOCATION TRACKING OF PRODUCTS AND PRODUCT DISPLAY ASSEMBLIES IN A WIRELESSLY CONNECTED ENVIRONMENT

(71) Applicant: Mobile Tech, Inc., Lake Oswego, OR (US)

(72) Inventors: Robert Logan Blaser, Farmington, UT (US); Hunter Wylie, Sherwood, OR (US); Jacob Michael Collier, Syracuse, UT (US)

(73) Assignee: MOBILE TECH, INC., Lake Oswego, OR (US)

( * ) Notice: Subject to any disclaimer, the term of this patent is extended or adjusted under 35 U.S.C. 154(b) by 0 days.

(21) Appl. No.: 16/001,601

(22) Filed: Jun. 6, 2018

(65) Prior Publication Data
US 2018/0288720 A1    Oct. 4, 2018

Related U.S. Application Data

(63) Continuation-in-part of application No. 15/656,520, filed on Jul. 21, 2017, and a continuation-in-part of
(Continued)

(51) Int. Cl.
G06Q 10/08    (2012.01)
H04W 56/00    (2009.01)
(Continued)

(52) U.S. Cl.
CPC ...... *H04W 56/0025* (2013.01); *G06Q 10/087* (2013.01); *G06Q 20/203* (2013.01);
(Continued)

(58) Field of Classification Search
CPC .......... G06F 17/60; G06F 21/00; G06F 21/30; G06F 21/45; G06K 5/00; G06K 15/00;
(Continued)

(56) References Cited

U.S. PATENT DOCUMENTS

D883,335    3/1908  O'Connor
3,444,547 A  5/1969  Surek
(Continued)

FOREIGN PATENT DOCUMENTS

AT    506665 A1    10/2009
CA    2465692 A1    11/2004
(Continued)

OTHER PUBLICATIONS

U.S. Appl. No. 15/875,957: Office of Petitions Decision, dated Feb. 21, 2018, 2 pages.
(Continued)

*Primary Examiner* — Shawkat M Ali
(74) *Attorney, Agent, or Firm* — Thompson Coburn LLP

(57) ABSTRACT

Disclosed herein are a number of example embodiments where wireless nodes are arranged in a wirelessly connected environment to support a variety of remote management operations, including location tracking, status monitoring, and remote control. In an example embodiment, the wireless nodes can be deployed in a retail store and provide remote management and control over any combination of product display assemblies, locks, power strips, display shelves, display hooks, and other node types.

50 Claims, 23 Drawing Sheets

Related U.S. Application Data application No. 15/367,028, filed on Dec. 1, 2016, said application No. 15/656,520 is a continuation of application No. 15/367,028.

(60) Provisional application No. 62/262,843, filed on Dec. 3, 2015, provisional application No. 62/650,992, filed on Mar. 30, 2018.

(51) Int. Cl.

| | | |
|---|---|---|
| H04L 29/08 | (2006.01) | |
| G06Q 20/20 | (2012.01) | |
| H04L 29/06 | (2006.01) | |
| H04W 4/02 | (2018.01) | |
| H04W 84/18 | (2009.01) | |

(52) U.S. Cl.
CPC .............. *H04L 67/04* (2013.01); *H04L 67/12* (2013.01); *H04L 67/303* (2013.01); *H04L 67/42* (2013.01); *H04W 4/026* (2013.01); *H04W 84/18* (2013.01)

(58) Field of Classification Search
CPC ...... G06Q 10/00; G06Q 10/08; G06Q 10/087; G06Q 20/203; G06Q 30/02; G06Q 30/06; G06Q 40/02; H04L 9/00; H04L 29/06; H04L 29/08; H04L 63/08; H04L 63/105; H04L 67/04; H04L 67/12; H04L 67/42; H04L 67/303; H04W 4/02; H04W 4/026; H04W 12/06; H04W 12/08; H04W 56/00; H04W 56/0025
USPC ...... 235/380, 383; 375/220; 705/1, 7.29, 10, 705/14.45, 26, 39; 726/2, 6
See application file for complete search history.

(56) References Cited

U.S. PATENT DOCUMENTS

| | | |
|---|---|---|
| 3,612,462 A | 10/1971 | Mooney et al. |
| 3,780,909 A | 12/1973 | Callahan et al. |
| D244,857 S | 6/1977 | Hayes |
| 4,075,878 A | 2/1978 | Best |
| 4,117,465 A | 9/1978 | Timblin |
| 4,335,931 A | 6/1982 | Kinnear |
| 4,354,613 A | 10/1982 | Desai et al. |
| 4,384,688 A | 5/1983 | Smith |
| 4,590,337 A | 5/1986 | Engelmore |
| 4,714,184 A | 12/1987 | Young et al. |
| 4,772,878 A | 9/1988 | Kane |
| 4,898,493 A | 2/1990 | Blankenburg |
| 5,033,709 A | 7/1991 | Yuen |
| 5,072,213 A | 12/1991 | Close |
| 5,146,205 A | 9/1992 | Keifer et al. |
| 5,176,465 A | 1/1993 | Holsted |
| 5,187,744 A | 2/1993 | Richter |
| 5,230,016 A | 7/1993 | Yasuda |
| 5,246,183 A | 9/1993 | Leyden |
| 5,436,792 A | 7/1995 | Leman et al. |
| 5,457,745 A | 10/1995 | Wang |
| 5,459,637 A | 10/1995 | Ma et al. |
| 5,517,434 A | 5/1996 | Hanson et al. |
| 5,543,782 A | 8/1996 | Rothbaum et al. |
| 5,570,267 A | 10/1996 | Ma |
| 5,586,002 A | 12/1996 | Notarianni |
| 5,615,258 A | 3/1997 | Ho |
| 5,685,436 A | 11/1997 | Davet |
| 5,751,548 A | 5/1998 | Hall et al. |
| 5,847,924 A | 12/1998 | Youn |
| 5,861,807 A | 1/1999 | Leyden et al. |
| D409,018 S | 5/1999 | Deuschle |
| 5,903,645 A | 5/1999 | Tsay |
| 5,923,528 A | 7/1999 | Lee |
| 5,982,855 A | 11/1999 | Miyamoto |
| 6,039,496 A | 3/2000 | Bishop |
| D433,953 S | 11/2000 | Woznicki et al. |
| 6,170,775 B1 | 1/2001 | Kovacik et al. |
| 6,236,435 B1 | 5/2001 | Gertz |
| D455,166 S | 4/2002 | Raad et al. |
| 6,380,855 B1 | 4/2002 | Ott |
| 6,386,906 B1 | 5/2002 | Burke |
| 6,400,560 B1 | 6/2002 | Chian |
| 6,476,717 B1 | 11/2002 | Gross et al. |
| 6,491,276 B1 | 12/2002 | Belliveau |
| 6,502,727 B1 | 1/2003 | Decoteau |
| 6,504,710 B2 | 1/2003 | Sutton et al. |
| 6,549,130 B1 | 4/2003 | Joao |
| 6,581,421 B2 | 6/2003 | Chmela et al. |
| 6,659,382 B2 | 12/2003 | Ryczek |
| 6,702,604 B1 | 3/2004 | Moscovitch |
| 6,714,983 B1 | 3/2004 | Koenck et al. |
| 6,731,212 B2 | 5/2004 | Hirose et al. |
| 6,748,707 B1 | 6/2004 | Buchalter et al. |
| 6,761,579 B2 | 7/2004 | Fort et al. |
| 6,773,172 B1 | 8/2004 | Johnson et al. |
| 6,781,825 B2 | 8/2004 | Shih et al. |
| 6,786,766 B1 | 9/2004 | Chopra |
| 6,799,994 B2 | 10/2004 | Burke |
| 6,831,560 B2 | 12/2004 | Gresset |
| 6,856,506 B2 | 2/2005 | Doherty et al. |
| 6,885,817 B2 | 4/2005 | Artonne et al. |
| 6,896,543 B2 | 5/2005 | Fort et al. |
| D508,916 S | 8/2005 | Lee |
| 6,935,883 B2 | 8/2005 | Oddsen, Jr. |
| 6,944,294 B2 | 9/2005 | Tsay |
| 6,946,961 B2 | 9/2005 | Frederiksen et al. |
| 6,952,343 B2 | 10/2005 | Sato |
| 6,961,401 B1 | 11/2005 | Nally et al. |
| 7,002,467 B2 | 2/2006 | Deconinck et al. |
| 7,015,596 B2 | 3/2006 | Pail |
| 7,032,872 B2 | 4/2006 | Sullivan |
| 7,052,296 B2 | 5/2006 | Yang et al. |
| 7,053,774 B2 | 5/2006 | Sedon et al. |
| 7,068,496 B2 | 6/2006 | Wong et al. |
| 7,081,822 B2 | 7/2006 | Leyden et al. |
| 7,085,491 B2 | 8/2006 | Chiang |
| 7,101,187 B1 | 9/2006 | Deconinck et al. |
| 7,135,972 B2 | 11/2006 | Bonato |
| 7,154,039 B1 | 12/2006 | Marszalek et al. |
| 7,209,038 B1 | 4/2007 | Deconinck et al. |
| 7,287,652 B2 | 4/2007 | Deconinck et al. |
| D545,826 S | 7/2007 | Richter |
| D563,444 S | 3/2008 | Brickzin |
| 7,352,567 B2 | 4/2008 | Hotelling et al. |
| 7,385,522 B2 | 6/2008 | Belden, Jr. et al. |
| 7,387,003 B2 | 6/2008 | Marszalek et al. |
| 7,446,659 B2 | 11/2008 | Marsilio et al. |
| 7,515,408 B2 | 4/2009 | Bakker et al. |
| 7,522,047 B2 | 4/2009 | Belden, Jr. et al. |
| 7,611,112 B2 | 11/2009 | Lin |
| 7,626,500 B2 | 12/2009 | Belden, Jr. et al. |
| 7,650,230 B1 | 1/2010 | Laverick et al. |
| 7,652,873 B2 | 1/2010 | Lee |
| 7,654,399 B2 | 2/2010 | Scholen et al. |
| 7,658,363 B2 | 2/2010 | Meyer |
| 7,667,601 B2 | 2/2010 | Rabinowitz et al. |
| 7,669,816 B2 | 3/2010 | Crain et al. |
| 7,684,185 B2 | 3/2010 | Farrugia |
| 7,688,205 B2 | 3/2010 | Ott |
| 7,696,857 B2 | 4/2010 | Kritt et al. |
| 7,710,266 B2 | 5/2010 | Belden, Jr. et al. |
| 7,712,661 B2 | 5/2010 | Thomas |
| 7,724,135 B2 | 5/2010 | Rapp et al. |
| 7,737,843 B2 | 6/2010 | Belden, Jr. et al. |
| 7,737,844 B2 | 6/2010 | Scott et al. |
| 7,737,845 B2 | 6/2010 | Fawcett et al. |
| 7,737,846 B2 | 6/2010 | Belden, Jr. et al. |
| 7,744,404 B1 | 6/2010 | Henson et al. |
| 7,848,833 B2 | 12/2010 | Li et al. |
| 7,866,623 B2 | 1/2011 | Lampman et al. |
| 7,883,279 B2 | 2/2011 | Kendall |
| 7,909,641 B1 | 3/2011 | Henson et al. |
| D635,555 S | 4/2011 | Giles |

(56) References Cited

U.S. PATENT DOCUMENTS

| | | |
|---|---|---|
| D636,778 S | 4/2011 | Corsini et al. |
| D640,247 S | 6/2011 | Baumann et al. |
| 7,969,305 B2 | 6/2011 | Belden, Jr. et al. |
| D641,756 S | 7/2011 | Hsieh et al. |
| 7,971,845 B2 | 7/2011 | Galant |
| D643,056 S | 8/2011 | Zaliauskas et al. |
| 8,009,348 B2 | 8/2011 | Zehner et al. |
| D645,047 S | 9/2011 | Wike |
| D649,076 S | 11/2011 | Alexander |
| 8,102,262 B2 | 1/2012 | Irmscher et al. |
| D661,646 S | 6/2012 | Son |
| 8,208,245 B2 | 6/2012 | Staats et al. |
| D663,972 S | 7/2012 | Alexander et al. |
| 8,251,325 B2 | 8/2012 | Molter |
| D668,660 S | 10/2012 | Norfolk |
| 8,282,060 B2 | 10/2012 | Fan |
| 8,289,131 B2 | 10/2012 | Cho et al. |
| D670,702 S | 11/2012 | Zhang et al. |
| D674,803 S | 1/2013 | Westrup |
| D678,293 S | 3/2013 | Meehan |
| D682,281 S | 5/2013 | Barnard et al. |
| 8,467,178 B2 | 6/2013 | Probst et al. |
| D687,440 S | 8/2013 | Shieh |
| 8,499,384 B2 | 8/2013 | Zerhusen |
| 8,531,829 B2 | 9/2013 | Oberpriller et al. |
| 8,558,688 B2 | 10/2013 | Henson et al. |
| 8,573,394 B2 | 11/2013 | Ahee et al. |
| D696,259 S | 12/2013 | Howarth et al. |
| 8,611,086 B1 | 12/2013 | Magnusson et al. |
| 8,698,617 B2 | 4/2014 | Henson et al. |
| 8,698,618 B2 | 4/2014 | Henson et al. |
| D704,194 S | 5/2014 | Young |
| 8,749,194 B1 | 6/2014 | Kelsch et al. |
| 8,749,963 B2 | 6/2014 | Staats et al. |
| 8,780,548 B2 | 7/2014 | Lee |
| 8,800,763 B2 | 8/2014 | Hale |
| 8,800,942 B2 | 8/2014 | Yu |
| 8,814,128 B2 | 8/2014 | Trinh et al. |
| 8,847,759 B2 | 9/2014 | Bisesti et al. |
| 8,851,565 B2 | 10/2014 | Hontz et al. |
| D717,804 S | 11/2014 | Budge |
| D718,316 S | 11/2014 | Veltz et al. |
| D719,144 S | 12/2014 | Eulette |
| 8,913,380 B2 | 12/2014 | Enomoto et al. |
| 8,955,807 B2 | 2/2015 | Alexander et al. |
| 8,963,498 B2 | 2/2015 | Ferguson |
| D725,119 S | 3/2015 | Gaylord |
| D726,732 S | 4/2015 | Lay et al. |
| 9,019,698 B2 | 4/2015 | Thiers |
| D732,037 S | 6/2015 | Wylie |
| 9,092,960 B2 | 7/2015 | Wheeler |
| 9,097,380 B2 | 8/2015 | Wheeler |
| 9,220,358 B2 | 12/2015 | Wheeler et al. |
| 9,229,494 B2 | 1/2016 | Rayner |
| D748,634 S | 2/2016 | Hofer et al. |
| 9,269,247 B2 | 2/2016 | Fawcett et al. |
| 9,303,809 B2 | 4/2016 | Reynolds et al. |
| D757,731 S | 5/2016 | Nguyen et al. |
| 9,373,236 B2 | 6/2016 | Oehl et al. |
| 9,396,631 B2 | 7/2016 | Fawcett et al. |
| D766,247 S | 9/2016 | Burmester |
| 9,478,110 B2 | 10/2016 | Fawcett et al. |
| 9,576,452 B2 | 2/2017 | Fawcett et al. |
| 9,641,539 B1 | 5/2017 | Votaw et al. |
| 9,659,472 B2 | 5/2017 | Fawcett et al. |
| D795,263 S | 8/2017 | Fujioka et al. |
| D798,302 S | 9/2017 | Burmester |
| 9,786,140 B2 | 10/2017 | Henson et al. |
| 9,847,806 B1 | 12/2017 | Dickie |
| 9,858,777 B2 | 1/2018 | Dandie et al. |
| 9,892,604 B2 | 2/2018 | Blaser et al. |
| 9,978,232 B2 | 5/2018 | Weusten et al. |
| 10,026,281 B2 | 7/2018 | Henson et al. |
| 2001/0049222 A1 | 12/2001 | Fort et al. |
| 2001/0055978 A1 | 12/2001 | Herrod et al. |
| 2002/0044406 A1 | 4/2002 | Shimoda et al. |
| 2002/0085343 A1 | 7/2002 | Wu et al. |
| 2002/0162366 A1 | 11/2002 | Chmela et al. |
| 2003/0007634 A1 | 1/2003 | Wang |
| 2003/0010859 A1 | 1/2003 | Ryczek |
| 2003/0128975 A1 | 7/2003 | Shevick |
| 2003/0137584 A1 | 7/2003 | Norvell et al. |
| 2003/0222149 A1 | 12/2003 | Solomon et al. |
| 2003/0222848 A1 | 12/2003 | Solomon et al. |
| 2003/0235029 A1 | 12/2003 | Doherty et al. |
| 2004/0003150 A1 | 1/2004 | Deguchi |
| 2004/0007721 A1 | 1/2004 | Forbes et al. |
| 2004/0017652 A1 | 1/2004 | Billington et al. |
| 2004/0077210 A1 | 4/2004 | Kollmann |
| 2004/0113819 A1 | 6/2004 | Gauthey et al. |
| 2004/0195192 A1 | 10/2004 | Belokin et al. |
| 2004/0201449 A1 | 10/2004 | Denison et al. |
| 2004/0230725 A1 | 11/2004 | Chen et al. |
| 2004/0233631 A1 | 11/2004 | Lord |
| 2005/0040934 A1 | 2/2005 | Shanton |
| 2005/0047104 A1 | 3/2005 | Grunow et al. |
| 2005/0073413 A1 | 4/2005 | Sedon et al. |
| 2005/0088572 A1 | 4/2005 | Pandit et al. |
| 2005/0149723 A1 | 7/2005 | Watkins et al. |
| 2005/0165806 A1 | 7/2005 | Roatis et al. |
| 2005/0206522 A1 | 9/2005 | Leyden et al. |
| 2005/0255895 A1 | 11/2005 | Lee et al. |
| 2006/0061958 A1 | 3/2006 | Solomon et al. |
| 2006/0067036 A1 | 3/2006 | Lin et al. |
| 2006/0148575 A1 | 7/2006 | Vitito |
| 2007/0075914 A1 | 4/2007 | Bates |
| 2007/0145210 A1 | 6/2007 | Fawcett et al. |
| 2007/0152633 A1 | 7/2007 | Lee |
| 2007/0159328 A1 | 7/2007 | Belden et al. |
| 2007/0221726 A1 | 9/2007 | Thomas |
| 2007/0229529 A1 | 10/2007 | Sekine et al. |
| 2007/0247793 A1 | 10/2007 | Carnevali |
| 2008/0104301 A1 | 5/2008 | Assouad et al. |
| 2008/0168806 A1 | 7/2008 | Belden et al. |
| 2008/0169923 A1 | 7/2008 | Belden et al. |
| 2008/0222849 A1 | 9/2008 | Lavoie |
| 2008/0288702 A1 | 11/2008 | Diab et al. |
| 2008/0300712 A1 | 12/2008 | Zachmann |
| 2009/0007390 A1 | 1/2009 | Tsang et al. |
| 2009/0033492 A1 | 2/2009 | Rapp et al. |
| 2009/0034221 A1 | 2/2009 | Kerrigan |
| 2009/0079566 A1 | 3/2009 | Goldstein et al. |
| 2009/0080684 A1 | 3/2009 | Groset et al. |
| 2009/0114556 A1 | 5/2009 | Tai et al. |
| 2009/0134997 A1 | 5/2009 | Godlewski |
| 2009/0166483 A1 | 7/2009 | Marsilio et al. |
| 2009/0173868 A1 | 7/2009 | Fawcett et al. |
| 2009/0179127 A1 | 7/2009 | Pettey |
| 2009/0183266 A1 | 7/2009 | Tan et al. |
| 2009/0225166 A1 | 9/2009 | Dronge |
| 2009/0303692 A1 | 12/2009 | Terlizzi |
| 2009/0328141 A1 | 12/2009 | Zhang et al. |
| 2010/0081337 A1 | 4/2010 | Dorogusker et al. |
| 2010/0138581 A1 | 6/2010 | Bird et al. |
| 2010/0172081 A1 | 7/2010 | Tian et al. |
| 2010/0195279 A1 | 8/2010 | Michael |
| 2010/0215355 A1 | 8/2010 | Olien |
| 2010/0326934 A1 | 12/2010 | Goldberg |
| 2011/0047844 A1 | 3/2011 | Fawcett et al. |
| 2011/0068919 A1 | 3/2011 | Rapp et al. |
| 2011/0114804 A1 | 5/2011 | Liu et al. |
| 2011/0187531 A1 | 8/2011 | Oehl et al. |
| 2011/0195786 A1 | 8/2011 | Wells |
| 2011/0254661 A1 | 10/2011 | Fawcett et al. |
| 2011/0278885 A1 | 11/2011 | Procter et al. |
| 2011/0283754 A1 | 11/2011 | Ezzo et al. |
| 2011/0303816 A1 | 12/2011 | Horvath et al. |
| 2011/0309934 A1 | 12/2011 | Henson et al. |
| 2012/0026119 A1 | 2/2012 | Judy et al. |
| 2012/0033375 A1 | 2/2012 | Madonna et al. |
| 2012/0037783 A1 | 2/2012 | Alexander et al. |
| 2012/0043247 A1 | 2/2012 | Westrup |
| 2012/0043451 A1 | 2/2012 | Alexander et al. |
| 2012/0155004 A1 | 6/2012 | Yukawa et al. |

(56) References Cited

U.S. PATENT DOCUMENTS

| | | |
|---|---|---|
| 2012/0175474 A1 | 7/2012 | Barnard et al. |
| 2012/0182680 A1 | 7/2012 | Wetzel et al. |
| 2012/0188689 A1 | 7/2012 | Leung |
| 2012/0189156 A1 | 7/2012 | Leung |
| 2012/0193496 A1 | 8/2012 | Li |
| 2012/0205326 A1 | 8/2012 | Richter et al. |
| 2012/0217371 A1 | 8/2012 | Abdollahzadeh et al. |
| 2012/0280810 A1 | 11/2012 | Wheeler |
| 2012/0286118 A1 | 11/2012 | Richards |
| 2012/0293330 A1 | 11/2012 | Grant et al. |
| 2012/0293924 A1 | 11/2012 | Dolci et al. |
| 2012/0303476 A1 | 11/2012 | Krzyzanowski et al. |
| 2013/0026322 A1 | 1/2013 | Wheeler et al. |
| 2013/0026332 A1 | 1/2013 | Liu |
| 2013/0043369 A1 | 2/2013 | Wheeler |
| 2013/0058023 A1 | 3/2013 | Supran et al. |
| 2013/0161054 A1 | 6/2013 | Allison et al. |
| 2013/0168527 A1 | 7/2013 | Wheeler et al. |
| 2013/0238516 A1 | 9/2013 | Moock et al. |
| 2013/0268316 A1* | 10/2013 | Moock ............... G06Q 30/0201 705/7.29 |
| 2013/0346661 A1 | 12/2013 | Hasenei |
| 2014/0058023 A1 | 2/2014 | Wan et al. |
| 2014/0111337 A1 | 4/2014 | Taylor et al. |
| 2014/0118930 A1 | 5/2014 | Sedon |
| 2014/0159898 A1 | 6/2014 | Wheeler et al. |
| 2014/0168884 A1 | 6/2014 | Wylie |
| 2014/0321048 A1 | 10/2014 | Kupferstein |
| 2014/0351098 A1 | 11/2014 | Shafer et al. |
| 2014/0355200 A1 | 12/2014 | Thiers |
| 2014/0380442 A1 | 12/2014 | Addepalli et al. |
| 2015/0048625 A1 | 2/2015 | Weusten et al. |
| 2015/0156900 A1 | 6/2015 | Yeh et al. |
| 2015/0186685 A1 | 7/2015 | Vroom et al. |
| 2015/0201723 A1 | 7/2015 | Rayner et al. |
| 2015/0212590 A1 | 7/2015 | Feldstein et al. |
| 2015/0235533 A1 | 8/2015 | Grant et al. |
| 2015/0348381 A1 | 12/2015 | Fawcett et al. |
| 2016/0042620 A1 | 2/2016 | Dandie et al. |
| 2016/0054469 A1 | 2/2016 | Li et al. |
| 2016/0055469 A1 | 2/2016 | Kim et al. |
| 2016/0105359 A1 | 4/2016 | Kim et al. |
| 2016/0135560 A1 | 5/2016 | Yeh |
| 2016/0239796 A1* | 8/2016 | Grant ..................... G06Q 30/06 |
| 2016/0307209 A1 | 10/2016 | Marszalek |
| 2016/0307415 A1 | 10/2016 | Marszalek et al. |
| 2016/0307416 A1 | 10/2016 | Marszalek et al. |
| 2016/0308952 A1 | 10/2016 | Marszalek et al. |
| 2016/0335859 A1 | 11/2016 | Sankey |
| 2017/0032636 A1 | 2/2017 | Henson et al. |
| 2017/0116832 A1 | 4/2017 | Weusten et al. |
| 2017/0164314 A1 | 6/2017 | Wylie et al. |
| 2017/0193780 A1 | 7/2017 | Moock et al. |
| 2017/0295953 A1 | 10/2017 | Sakata et al. |
| 2017/0300721 A1 | 10/2017 | Blaser et al. |
| 2018/0007648 A1 | 1/2018 | Wylie et al. |
| 2018/0035827 A1 | 2/2018 | Grant et al. |
| 2018/0049563 A1 | 2/2018 | Henson et al. |

FOREIGN PATENT DOCUMENTS

| | | |
|---|---|---|
| CN | 103098104 A | 5/2013 |
| DE | 202009013722 U1 | 1/2011 |
| EP | 0745747 A1 | 12/1996 |
| EP | 1575249 A2 | 9/2005 |
| EP | 2619737 A1 | 7/2013 |
| ES | 1058183 U | 11/2004 |
| FR | 2595227 A1 | 9/1987 |
| FR | 2768906 A1 | 4/1999 |
| FR | 2868459 A1 | 10/2005 |
| GB | 2440600 A | 2/2008 |
| JP | H0573857 U | 10/1993 |
| JP | H0668913 A | 3/1994 |
| JP | 3100287 B2 | 10/2000 |
| WO | 1997031347 A1 | 8/1997 |
| WO | 2004/038670 A1 | 5/2004 |
| WO | 2004038670 A1 | 5/2004 |
| WO | 2012039794 A1 | 3/2012 |
| WO | 2012069816 A1 | 5/2012 |
| WO | 2012151130 A2 | 11/2012 |
| WO | 2013015855 A2 | 1/2013 |
| WO | 2013068036 A1 | 5/2013 |
| WO | 2013134484 A1 | 9/2013 |
| WO | 2014019072 A1 | 2/2014 |
| WO | 2014107184 A2 | 7/2014 |
| WO | 2014134718 A1 | 9/2014 |
| WO | 2015050710 A2 | 4/2015 |
| WO | 2015051840 A1 | 4/2015 |
| WO | 2015169373 A1 | 11/2015 |
| WO | 2015/184993 A1 | 12/2015 |
| WO | 2016130762 A1 | 8/2016 |
| WO | 2016179250 A2 | 11/2016 |

OTHER PUBLICATIONS

U.S. Appl. No. 15/875,990, filed Jan. 19, 2018, 33 pages.
U.S. Appl. No. 15/875,990, filed Feb. 14, 2018, 3 pages.
U.S. Appl. No. 15/659,556: Non-Final Rejection, dated Jan. 24, 2018, 22 pages.
U.S. Appl. No. 15/659,556: Notice of Publication, dated Feb. 1, 2018, 1 page.
U.S. Appl. No. 15/659,556, filed Jul. 25, 2017, 62 pages.
U.S. Appl. No. 15/659,556, filed Aug. 2, 2017, 3 pages.
PCT/US17/44230: Initial Publication with ISR, dated Feb. 1, 2018, 46 pages.
PCT/US17/44230: Written Opinion of the International Search Authority, dated Feb. 1, 2018, 7 pages.
U.S. Appl. No. 15/600,642, filed May 19, 2017, 30 pages.
U.S. Appl. No. 15/600,642, filed May 31, 2017, 3 pages.
Office Action for U.S. Appl. No. 16/001,631 dated Sep. 14, 2018.
Prosecution History for U.S. Appl. No. 15/367,028, filed Dec. 1, 2016.
Prosecution History for U.S. Appl. No. 15/656,520, filed Jul. 21, 2017.
U.S. Appl. No. 29/604,812: Requirement for Restriction/Election, dated Mar. 19, 2018, 7 pages.
U.S. Appl. No. 29/604,812, filed May 19, 2017, 29 pages.
U.S. Appl. No. 29/604,812, filed May 23, 2017, 3 pages.
U.S. Appl. No. 29/604,812, filed Nov. 27, 2017, 3 pages.
U.S. Appl. No. 15/367,028: Amendment/Req. Reconsideration-After Non-Final Reject, dated Jan. 30, 2018, 14 pages.
U.S. Appl. No. 15/367,028, filed Nov. 22, 2017, 3 pages.
U.S. Appl. No. 15/367,028: Application Data Sheet to update/correct info, Nov. 21, 2017, 7 pages.
U.S. Appl. No. 15/367,028: Non-Final Rejection, dated Oct. 30, 2017, 12 pages.
U.S. Appl. No. 15/367,028: Applicant Response to Pre-Exam Formalities Notice, dated Feb. 13, 2017, 12 pages.
U.S. Appl. No. 15/367,028, filed Dec. 1, 2016, 113 pages.
U.S. Appl. No. 15/367,028, filed Feb. 28, 2017, 3 pages.
U.S. Appl. No. 15/367,028, filed Dec. 13, 2016, 3 pages.
U.S. Appl. No. 15/367,028, filed Dec. 28, 2016, 3 pages.
U.S. Appl. No. 15/367,028: Notice of Publication, dated Jun. 8, 2017, 1 page.
U.S. Appl. No. 15/367,028: Notice to File Missing Parts, dated Dec. 13, 2016, 3 pages.
U.S. Appl. No. 15/367,028: Request for Corrected Filing Receipt, dated Dec. 22, 2016, 7 pages.
PCT/US16/64863 / WO2017/096330: International Search Report, dated Oct. 20, 2017, 5 pages.
PCT/US16/64863 / WO2017/096330: Initial Publication without ISR, dated Jun. 8, 2017.
U.S. Appl. No. 14/097,171, filed Aug. 2, 2017, 3 pages.
U.S. Appl. No. 14/097,171: Amendment/Req. Reconsideration-After Non-Final Reject, dated Jul. 1, 2015, 7 pages.
U.S. Appl. No. 14/097,171: Amendment/Req. Reconsideration-After Non-Final Reject, dated Aug. 17, 2016, 7 pages.

(56) References Cited

OTHER PUBLICATIONS

U.S. Appl. No. 14/097,171: Applicant Response to Pre-Exam Formalities Notice, Feb. 24, 2014, 9 pages.
U.S. Appl. No. 14/097,171, filed Dec. 4, 2013, 23 pages.
U.S. Appl. No. 14/097,171, filed Mar. 11, 2014, 3 pages.
U.S. Appl. No. 14/097,171, filed Dec. 23, 2013, 3 pages.
U.S. Appl. No. 14/097,171, filed Sep. 17, 2015, 9 pages.
U.S. Appl. No. 14/097,171: Final Rejection, dated Nov. 10, 2016, 14 pages.
U.S. Appl. No. 14/097,171: Issue Fee Payment, dated Aug. 2, 2017, 1 page.
U.S. Appl. No. 14/097,171: Issue Notification, dated Aug. 23, 2017, 1 page.
U.S. Appl. No. 14/097,171: Non-Final Rejection, dated Jan. 2, 2015, 6 pages.
U.S. Appl. No. 14/097,171: Non-Final Rejection, dated Mar. 17, 2016, 10 pages.
U.S. Appl. No. 14/097,171: Notice of Allowance and Fees Due, dated May 2, 2017, 11 pages.
U.S. Appl. No. 14/097,171: Notice of Publication, dated Jun. 19, 2014, 1 page.
U.S. Appl. No. 14/097,171: Notice to File Missing Parts, dated Dec. 23, 2013, 2 pages.
U.S. Appl. No. 14/097,171: RCE and Amendments, dated Feb. 17, 2016, 11 pages.
U.S. Appl. No. 14/097,171: RCE and Amendments, dated Apr. 10, 2017, 18 pages.
U.S. Appl. No. 15/667,436: Non-Final Rejection, dated Feb. 22, 2018, 9 pages.
U.S. Appl. No. 15/667,436: Notice of Publication, dated Jan. 18, 2018, 1 page.
U.S. Appl. No. 15/667,436: Applicant Response to Pre-Exam Formalities Notice, dated Oct. 5, 2017, 11 pages.
U.S. Appl. No. 15/667,436, filed Aug. 2, 2017, 25 pages.
U.S. Appl. No. 15/667,436, filed Aug. 10, 2017, 3 pages.
U.S. Appl. No. 15/667,436: Notice to File Missing Parts, dated Aug. 10, 2017, 2 pages.
U.S. Appl. No. 15/875,957, filed Jan. 19, 2018, 30 pages.
U.S. Appl. No. 15/875,957, filed Feb. 15, 2018, 3 pages.
"35 mm Camera Display"—Walmart Publication 1995, 5 pages.
"Declaration of Mike Cook", *Vanguard Products Group, Inc.*v. *Merchandising Technologies, Inc.*,Case No. 3:10-cv-392-BR, U.S. District Court for the District of Oregon, Oct. 20, 2010, pp. 1-7.
"Declaration of Thaine Allison in Support of Patent Owner's Reply to Petitioner's Opposition to Patent Owner's Motion to Amend", Inter Partes Review of U.S. Pat. No. 7,909,641, Case IPR2013-00122, Feb. 5, 2014, pp. 1-13.
"Deposition of Thaine Allison, III", Inter Partes Review of U.S. Pat. No. 7,909,641, Case IPR2013-00122, Feb. 24, 2014, pp. 1-198.
"MTI Freedom Universal 2.0 Product Manual", Dec. 2008, pp. 1-21.
"Reasons for Substantial New Question of Patentability and Supplemental Examination Certificate", Inter Partes Review of U.S. Pat. No. 7,909,641, Case IPR2013-00122, Jan. 30, 2013, pp. 1-12.
270.D004 / U.S. Appl. No. 29/604,812: Requirement for Restriction/Election, Mar. 19, 2018, 7 pages.
270.D004 / U.S. Appl. No. 29/604,812: Application as filed May 19, 2017, 29 pages.
270.D004 / U.S. Appl. No. 29/604,812: Filing Receipt, May 23, 2017, 3 pages.
270.D004 / U.S. Appl. No. 29/604,812: Filing Receipt, Nov. 27, 2017, 3 pages.
270.P001 / U.S. Appl. No. 15,367,028: Amendment/Req. Reconsideration-After Non-Final Reject, Jan. 30, 2018, 14 pages.
270.P001 / U.S. Appl. No. 15,367,028: Filing Receipt, Nov. 22, 2017, 3 pages.
270.P001 / U.S. Appl. No. 15/367,028: Application Data Sheet to update/correct info, Nov. 21, 2017, 7 pages.
270.P001 / U.S. Appl. No. 15/367,028: Non-Final Rejection, Oct. 30, 2017, 12 pages.
Excerpt from Bruce Schneier, Applied Cryptology: Protocols, Algorithms, and Source Code in C (1994), 14 pages.
International Search Report for PCT/US2011/037235 dated Oct. 21, 2011.
MTI 2008 PowerPoint, "Vanguard Program" (Exhibit 1005 of Declaration of Mike Cook), pp. 1-9.
Propelinteractive, "Freedom Universal 2 Animation 003.wmv", YouTube Video <https://www.youtube.com/watch?v=_odGNnQvOBQ&t=1s, published on Feb. 16, 2010 (see sample screenshots, pp. 1-24).
Propelinteractive, "Installing LP3 Old Version", YouTube Video <https://www.youtube.com/watch?v=FRUa0FWiDRw&t=1s,> published on Jun. 28, 2010 (see sample screenshots, pp. 1-9).
Propelinteractive, "MTI LP3 Product Mounting", YouTube Video <https://www.youtube.com/watch?v=KX4TEuNCI,> published on Jun. 23, 2010 (see sample screenshots, pp. 1-11).
Protex International Corp., "Instructions for PowerPro Detangler", 2005, 1 page.
Protex International Corp., "Instructions for PowerPro Sensor Head Cameras and Camcorders (Power and Security)", 2007, pp. 1-9.
Protex International Corp., "PowerPro System", 2006, pp. 1-2.
Retailgeek, "Virtual Tour of MTI Retail Innovation Center in 2009," YouTube Video <https://www.youtube.com/watch?v=-wUvcDAmhjO,> published on Aug. 2, 2010 (see transcript and sample screenshots, pp. 1-20).
Reuters, "MTI Begins Shipping Freedom TM Universal 2.0 Merchandising Solution", Oct. 1, 2008, pp. 1-3.
U.S. Appl. No. 61/607,802, filed Mar. 7, 2012.
U.S. Appl. No. 61/620,621, filed Apr. 5, 2012.
U.S. Appl. No. 61/774,870, filed Mar. 8, 2013.
U.S. Appl. No. 61/884,098, filed Sep. 29, 2013.
Unicam Europe, "Freedom Lp3 4.17.09", SlideShare Presentation <https://www.slideshare.net/Borfu/freedom-lp3-41709,> published on Jul. 28, 2009 (pp. 1-9).
U.S. Appl. No. 29/415,938 and prosecution history, app filed Mar. 15, 2012.
U.S. Appl. No 16/206,866.2: app as filed Dec. 23, 2016.
U.S. Appl. No 62/323,511: app as filed Apr. 15, 2016.
U.S. Appl. No. 15/488,370: app as filed Apr. 14, 2017.
U.S. Appl. No. 15/488,379: app as filed Apr. 14, 2017.
PCT/US2017/027798: app as filed Apr. 14, 2017.
PCT/US2017/027801: app as filed Apr. 14, 2017.
U.S. Appl. No. 29/605,579: app as filed May 26, 2017.
U.S. Appl. No. 15/488,373: app as filed Apr. 14, 2017.
U.S. Appl. No. 15/488,383: app as filed Apr. 14, 2017.
U.S. Appl. No. 29/605,580: app as filed May 26, 2017.
U.S. Appl. No. 29/605,581: app as filed May 26, 2017.
U.S. Appl. No. 29/605,791: app as filed May 30, 2017.
U.S. Appl. No. 29/605,793: app as filed May 30, 2017.
U.S. Appl. No. 29/605,583: app as filed May 26, 2017.
U.S. Appl. No. 12/351,837: app as filed Jan. 10, 2009.
U.S. Appl. No. 14/845,146 and prosecution history, app filed Sep. 3, 2015.

* cited by examiner

| Store: | Branch Code: | Contact Name: | City/State: | Node Count: |
|---|---|---|---|---|
| Store 1 Name | ... | ... | ... | ... |
| Store 2 Name | ... | ... | ... | ... |
| ⋮ | | | | |
| Store n Name | ... | ... | ... | ... |

Figure 13F

LOCATION TRACKING OF PRODUCTS AND PRODUCT DISPLAY ASSEMBLIES IN A WIRELESSLY CONNECTED ENVIRONMENT

CROSS-REFERENCE AND PRIORITY CLAIM TO RELATED PATENT APPLICATIONS

This patent application claims priority to U.S. provisional patent application 62/650,992, filed Mar. 30, 2018, and entitled "Wirelessly Connected Environment of Wireless Nodes", the entire disclosure of which is incorporated herein by reference.

This patent application is also a continuation-in-part of U.S. patent application Ser. No. 15/367,028, filed Dec. 1, 2016, entitled "Electronically Connected Environment", and published as US Pat. App. Pub. 2017/0164314, which claims priority to U.S. provisional patent application 62/262,843, filed Dec. 3, 2015, and entitled "Mesh Network for A Retail Display", the entire disclosures of each of which are incorporated herein by reference.

This patent application is also a continuation-in-part of U.S. patent application Ser. No. 15/656,520, filed Jul. 21, 2017, entitled "Electronically Connected Environment", and published as US Pat. App. Pub. 2018/0007648, which is a continuation of U.S. patent application Ser. No. 15/367,028, filed Dec. 1, 2016, entitled "Electronically Connected Environment", and published as US Pat. App. Pub. 2017/0164314, which claims priority to U.S. provisional patent application 62/262,843, filed Dec. 3, 2015, and entitled "Mesh Network for A Retail Display", the entire disclosures of each of which are incorporated herein by reference.

This patent application is also related to (1) U.S. patent application Ser. No. 16/001,605, filed this same date, entitled "Remote Monitoring and Control over Wireless Nodes in a Wirelessly Connected Environment", and (2) U.S. patent application Ser. No. 16/001,631, filed this same date, entitled "Wirelessly Connected Hybrid Environment of Different Types of Wireless Nodes", the entire disclosures of each of which are incorporated herein by reference.

INTRODUCTION

There is a need for improvement with respect to how different items of equipment in environments such as retail stores can be managed. For example, tracking the locations and status of different equipment items can be a daunting task that has conventionally required the deployment of heavy human resources. As solutions to this problem, a number of innovative applications of wireless communication technology are disclosed herein.

For example, wireless communication technology can be applied to items of equipment to provide location awareness for a system that manages the equipment items. Similarly, wireless communication technology can be applied to gather status data from the equipment items, where such status data can then be remotely accessed through user interfaces. Through such user interfaces, users can review the status data, monitor, and control the various equipment items.

In an example embodiment for location awareness, a plurality of wireless nodes can be arranged as a wireless network, wherein each of a plurality of the wireless nodes includes a wireless transceiver for wireless communication over the wireless network, and wherein a plurality of the wireless nodes are part of different product display assemblies, each product display assembly configured to connect with a product for presentation of the product to a consumer, A computer system can be configured for wireless communication with the wireless network. Each of a plurality of the product display assemblies can be configured to wirelessly transmit data to the computer system via the wireless network that pairs an identifier for the product display assembly with an identifier for the product. The computer system can be further configured to (1) receive the wirelessly transmitted data via the wireless network, (2) store data that identifies a location for each of a plurality of the product display assemblies in association with identifiers for the product display assemblies, and (3) create a data structure based on the received data and the stored data, wherein the data structure tracks locations for the products based on the pairings between product display identifiers and product identifiers and the associations between locations and product display identifiers. Similar location awareness functionality can be provided for types of wireless nodes other than product display assemblies.

In an example embodiment for remote monitoring and control, a plurality of wireless nodes can be arranged as a wireless network, wherein each of a plurality of the wireless nodes includes a wireless transceiver for wireless communication over the wireless network. A computer system can be configured for wireless communication with the wireless network. Each of a plurality of the wireless nodes can be configured to (1) log data representative of a plurality of events, and (2) wirelessly transmit the event log data to the computer system via the wireless network. The computer system can be further configured to (1) receive the wirelessly transmitted event log data via the wireless network, (2) create a data structure based on the received event log data that tracks the logged events for a plurality of the wireless nodes, (3) generate a plurality of commands corresponding to a plurality of the wireless nodes in response to input, and (4) wirelessly transmit the commands to the corresponding wireless nodes via the wireless network. The wireless nodes can be further configured to be controllable in response to the wirelessly transmitted commands corresponding thereto. As examples, the event log data can represent events such as customer interactions with a wireless node, access attempts by authorized users with a wireless node, and others. An example of commands can include arm/disarm commands with respect to security functions for wireless nodes, lock/unlock commands, and others.

In yet another example embodiment, the wireless network of wireless nodes can include wireless nodes of different node types, each remotely managed via a common interface. Examples of different node types can include product display assemblies, locks, power strips, display hooks, etc. which may be present in an environment such as a retail store. Such a hybrid wirelessly connected environment of different types of wireless nodes can provide users with much more efficient management and control over wireless nodes because the common interface can eliminate a need for a siloed approach where different software solutions are needed for different node types.

Furthermore, many environments such as retail stores can be very noisy in terms of wireless signal interference. For example, the presence of large number of customers in a retail store (where each customer will likely be carrying his or her own wireless device such as a smart phone) in combination with the large number of electronic products in the retail store can be expected to create a noisy signal environment which may undermine the reliability of a given wireless communication link between a wireless node in the wirelessly connected environment and a gateway computer or the like. As a solution to this problem, the wireless nodes can be arranged into a wireless mesh network, and such a wireless mesh network can help prevent data communication losses between the wireless nodes and gateway computer.

These and other features and advantages of the present invention will be described hereinafter to those having ordinary skill in the art.

BRIEF DESCRIPTION OF THE DRAWINGS

FIG. 12 shows an example process flow for alert generation with respect to a wireless node in the system.

FIGS. 13A-13G show example GUIs for remote management and control of wireless nodes in example connected environment systems.

DETAILED DESCRIPTION OF EXAMPLE EMBODIMENTS

Figure 1:
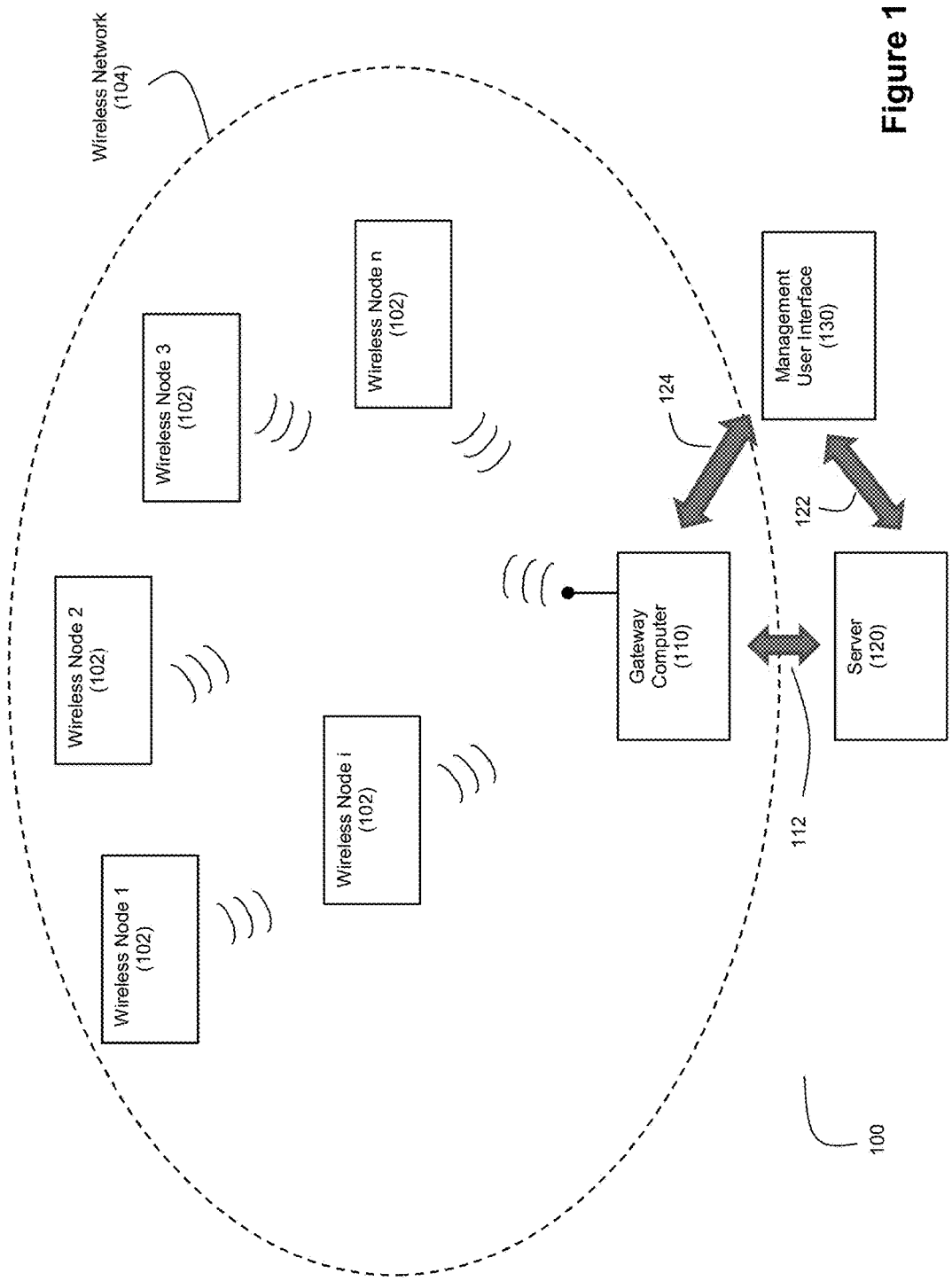
FIG. 1 discloses an example connected environment system of wireless nodes.

FIG. 1 shows an example system 100 that can serve as a connected environment of wireless nodes 102. Each wireless node 102 may include a wireless transceiver that allows for the formation of wireless network 104 through which the wireless nodes 102 can communicate with a remote computer system such as gateway computer 110. Each wireless node 102 may also have an associated node identifier (Node ID) that serves to identify that wireless node 102 within system 100. Any of a number of types of identifiers can be used as Node IDs, such as network addresses or MAC addresses used for communicating with particular wireless nodes 102 within the system, or other unique identifiers that may be tied to wireless nodes 102 (e.g., serial numbers, etc.). Each wireless node 102 may also be configured to communicate with other wireless nodes 102 within the wireless network 104. As an example, the wireless network 104 may be configured as a wireless mesh network which can provide robust and reliable communication pathways from wireless nodes 102 not only to the gateway computer 110 but also to each other and through each other to gateway computer 110, which can be highly advantageous when the wireless nodes 102 are located in noisy environments that may include various forms of potential signal interference. For example, the system 100 may be deployed in a number of noisy environments, an example of which is a retail store such as an electronics retail store. The presence of large number of customers in the retail store (where each customer will likely be carrying his or her own wireless device such as a smart phone) in combination with the large number of electronic products in the retail store can be expected to create a noisy signal environment, and the configuration of wireless network 104 as a wireless mesh network can help prevent data communication losses between the wireless nodes 102 and gateway computer 110. Also, the wireless network 104 may rely on any of a number of wireless communication technologies. For example, the wireless network 104 could be a local Wi-Fi network. As another example, the wireless network 104 could be a wireless network that uses Bluetooth, BTLE, or other networking techniques (e.g, Zigbee).

Continuing with the retail store environment example, the wireless nodes 102 may correspond to one or more types of devices that are located throughout the store. For example, one or more of the wireless nodes 102 may be included as part of or operatively coupled with one or more of the following types of devices: a product display assembly, a display shelf, a display hook (e.g., a peg hook), a lock (which may regulate access to doors or the like for enclosed spaces such as cabinets, rooms, etc.), a power outlet, a power strip, an audio/video controller, a camera, a sensor, a status indicator, a docking station (e.g., a docking system for a portable computing device such as a tablet computer), goods, etc.

Gateway computer 110 can serve as a hub for collecting data from and sending data to the wireless nodes 102. The data sent from gateway computer 110 to a wireless node can include command data for managing and controlling a wireless node, examples of which are discussed below. The gateway computer 110 can also communicate over a network 112 with a remote computer system such as server 120 via a communication protocol such as RS-232 (although it should be understood that alternative communication protocols could be employed). In this fashion, server 120 can further connect the wireless nodes 102 with other remote computers via wide area networks such as the Internet.

A management user interface 130 can interact with the gateway computer 110 and/or server 120 to provide users with access to data from the wireless nodes 102 as well as control over the wireless nodes 102. The management user interface 130 can be executed by a computer that is in communication with the gateway computer 110 via a network connection 124 and/or server 120 via a network connection 122 (where such a computer could take the form of a tablet computer, a smart phone, or other forms such as laptop computers, desktop computers, etc.). Network connections 122 and 124 can be any suitable network connection for connecting the management user interface 130 with the server 120 and/or gateway (e.g., a WiFi connection, an Ethernet connection, etc.). However, it should be understood that management user interface 130 could also be executed by the gateway computer 110 and/or server 120 themselves.

Server 120 can be connected with a number of different wireless networks 104 that are spread over different locations, such as a wide geographic area. Continuing with the retail store environment example from above, different retail stores can have their own wireless networks 104, and these different wireless networks 104 can be communicatively coupled with a common server 120 (where it should be understood that the common server 120 may include a network of servers, such as in a cloud service arrangement). In this fashion, server 120 can aggregate data collected from wireless nodes 102 in a number of different retail stores. Further still, the server 120 can make such aggregated data available to remote users via the management user interface 130 that is linked into the server 120 via a network connection 122. In this fashion, a user of the management user interface 130 can remotely monitor and control wireless nodes that are spread across a number of different retail stores.

Additional details about example embodiments of the wirelessly connected environment of system 100 can be found in the above-referenced and incorporated US Pat App Pub 2017/0164314. For example, while a retail store environment is discussed herein as an example, it should be understood that the system 100 of FIG. 1 could be deployed in other environments as well, as discussed in US Pat App Pub 2017/0164314.

Figure 2:
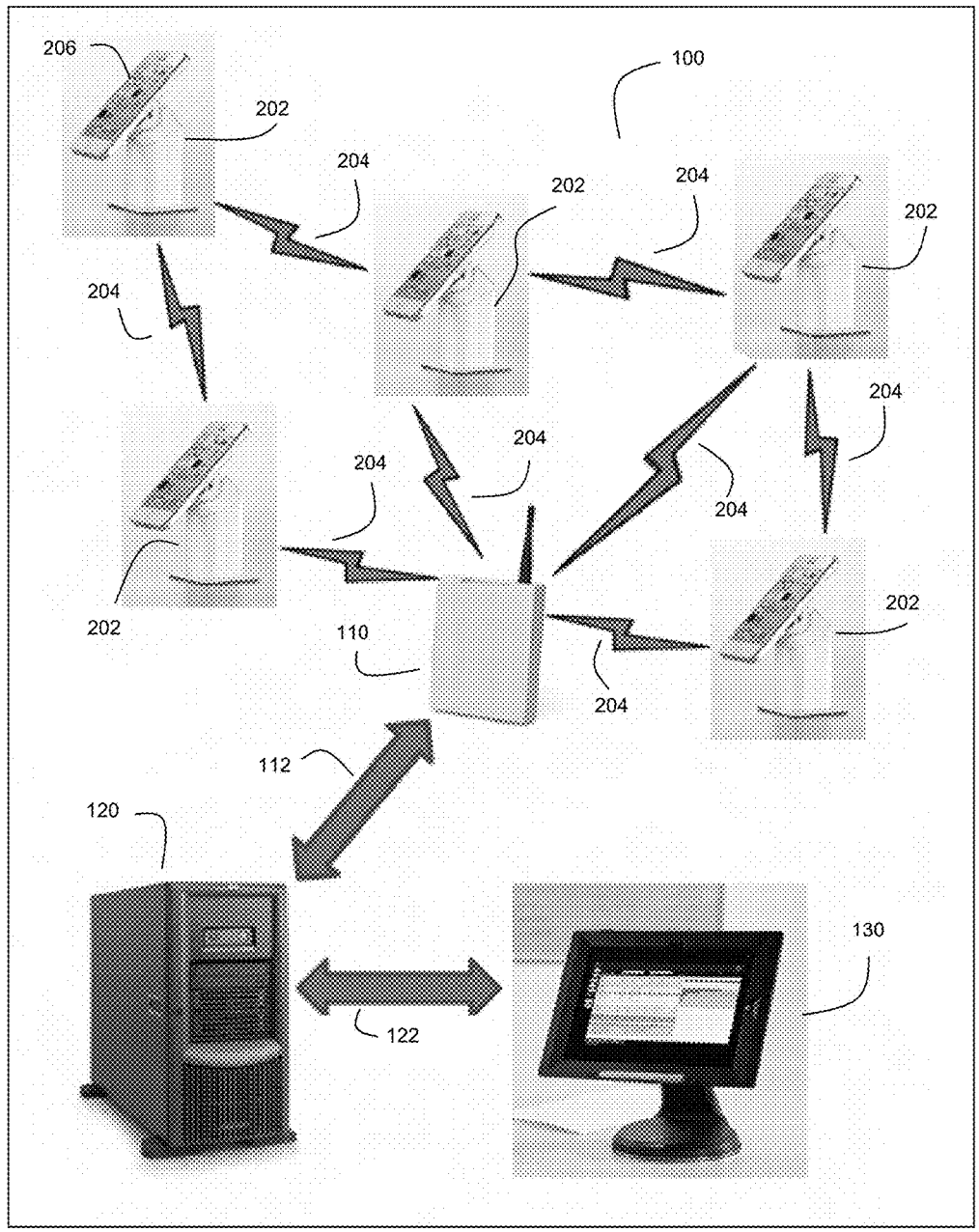
FIG. 2 discloses an example connected environment system that comprises a plurality of product display assemblies.

FIG. 2 shows an example embodiment where the system 100 where the wireless nodes 102 correspond to a plurality of different product display assemblies 202. The product display assemblies 202 can be configured to secure and display products for presentation to consumers. As examples, such products can be electronic devices 206 (e.g., smart phones, tablet computers, smart watches, cameras, etc.). In the example of FIG. 2, the product display assemblies 202 can be arranged as a wireless mesh network via wireless links 204. The product display assemblies 202 can also wirelessly communicate with the gateway computer 110 via the wireless mesh network, and the gateway computer 110 can communicate over network 112 with server 120. Through these connections, the server 120 can collect data from the various product display assemblies 202 and make such data available to remote users via the management user interface 130 linked into the server 120 via a network connection 122. However, as noted above in connection with FIG. 1, the management user interface 130 may also or alternatively link into gateway computer 110 via network connection 124.

Figure 3A:
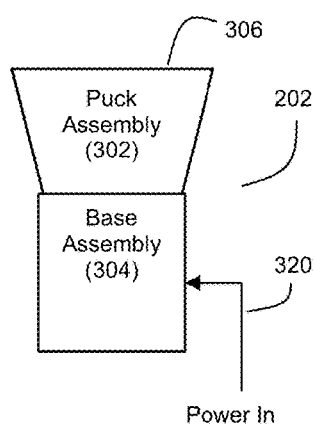
FIGS. 3A and 3B show an example product display assembly.
Figure 3B:
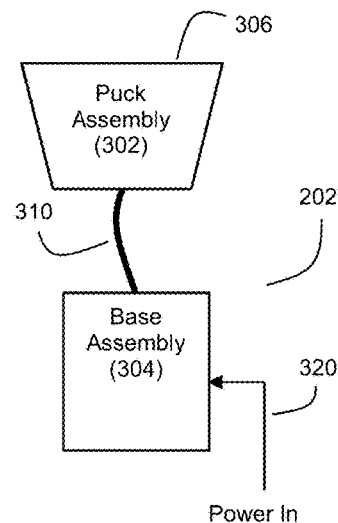

FIGS. 3A and 3B show an example embodiment of a product display assembly 202 that includes a puck assembly 302 and a base assembly 304. Tether 310 connects the puck assembly 302 with base assembly 304. While the ensuing examples will discuss a product display assembly 202 configured as a wireless node 102 where the product display assembly 202 includes a puck assembly 302 and base assembly 304, it should be understood that other types of product display assemblies could be employed as wireless nodes 102 within system 100 (e.g., a product display assembly that may include only a puck assembly 302 or other singular component for displaying a product to a customer).

An electronic device can be mounted on surface 306 of the puck assembly 302 so that the electronic device can be securely displayed to customers in a store. The puck assembly 302 is moveable between a rest position and a lift position. When in the rest position, the puck assembly 302 contacts the base assembly 304, as shown in FIG. 3A. Power can be provided to the base assembly 304 via input power line 320, and this power can be distributed to the puck assembly 302. When in the lift position, the puck assembly 302 separates from the base assembly 304, as shown by FIG. 3B. FIG. 3B also shows how the tether 310 remains connected to the puck assembly 302 and the base assembly 304 when the puck assembly 302 is in the lift position. This allows for a customer to pick up, hold, and inspect the electronic device when making a purchase decision. To provide ease of handling, tether 310 may be a retractable tether. However, it should also be noted that some practitioners may choose to omit the tether 310 from the product display assembly 202, in which case the puck assembly 302 would be completely separated from the base assembly 304 when the puck assembly is in the lift position.

Examples of product display assemblies 202 that can be adapted for use in the practice of the embodiments described herein are disclosed in U.S. Pat. Nos. 8,558,688, 8,698,617, 8,698,618, and 9,786,140; and U.S. Patent Application Publication Nos. 2014/0159898, 2017/0032636, 2017/0164314, and 2017/0300721, the entire disclosures of each of which are incorporated herein by reference.

Figure 5A:
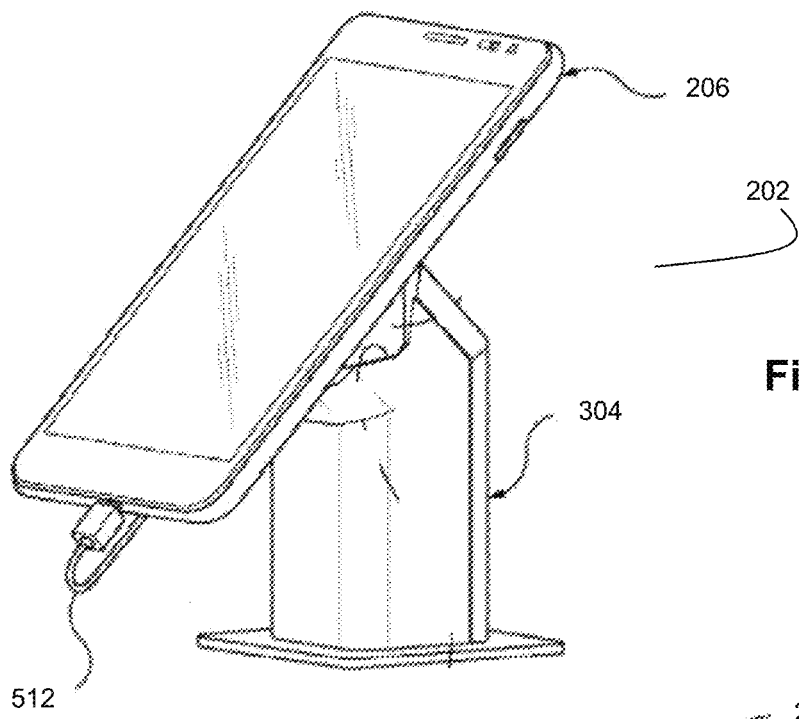
FIGS. 5A and 5B show example product display assemblies.
Figure 5B:
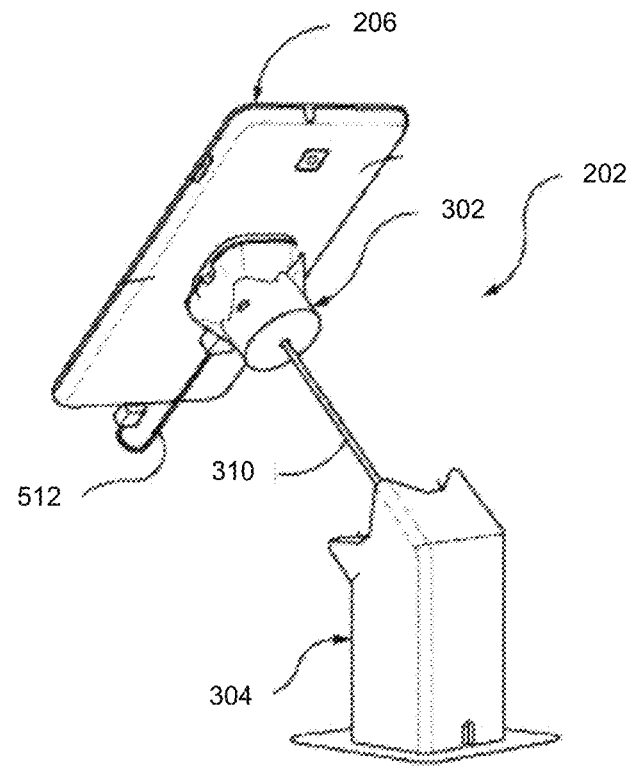

For example, FIGS. 5A and 5B reproduce FIGS. 27 and 28 from the incorporated '140 patent and show an example product display assembly 202 that is further described in the '140 patent. The product display assembly 202 shown by FIGS. 5A and 5B includes a puck assembly 302 and a base assembly 304. An electronic device 206 can be mounted on and electrically connected to the puck assembly 302, and the puck assembly 302 can be moved between (1) a rest position where the puck assembly 302 rests on the base assembly 304 (see FIG. 5A) and (2) a lift position where the puck assembly 302 does not rest on the base assembly 304 (see FIG. 5B). As noted, the product display assembly 202 may optionally include a tether assembly 310 that keeps the puck assembly 302 connected to the base assembly 304 even when the puck assembly 302 is in the lift position. A power cable 512 provides an electrical connection between the puck assembly 302 and an electronic device 206 for display through which the electronic device 206 can be charged. The puck assembly 302 can receive power from a power source via the base assembly 304 when the puck assembly is at rest. Electrical contacts included on the puck assembly 302 and base assembly 304 can contact each other when the puck assembly 302 is at rest, thereby forming an electrical connection through which power can be delivered from a power source (not shown) to the puck assembly 302 via the base assembly 304 and the electrical connection formed by the contacts. When the puck assembly 302 is lifted, the contacts lose contact with each other, thereby breaking the electrical connection.

Figure 3C:
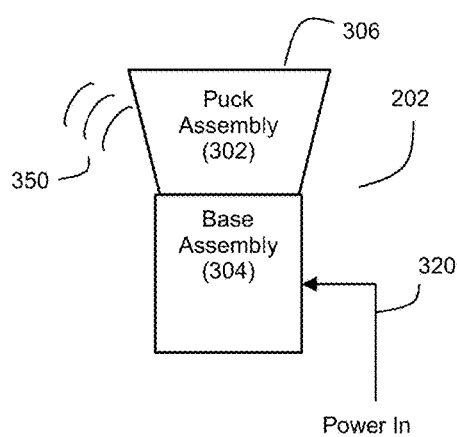
FIGS. 3C and 3D show examples of product display assemblies configured as wireless nodes for inclusion in a connected environment system in combination with an example embodiment of a hardware module.
Figure 3D:
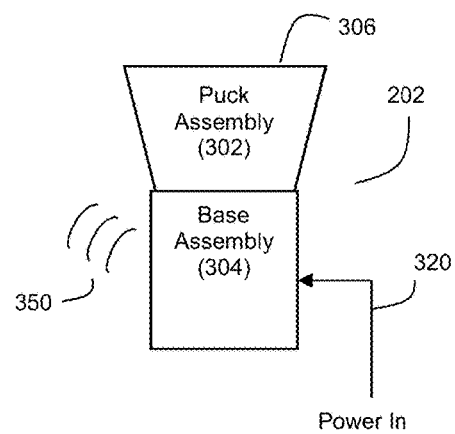

FIG. 3C shows an example where the product display assembly 202 is configured as a wireless node 102 by including a wireless transceiver in the puck assembly 202, to thereby permit the puck assembly 302 to send and receive wireless signals 350 via wireless network 104. FIG. 3D shows another example where the product display assembly 202 is configured as a wireless node 102 by including a wireless transceiver in the base assembly 304, to thereby permit the base assembly 304 to send and receive wireless signals 350 via wireless network 104. Furthermore, if desired by a practitioner, wireless transceivers may optionally be included in both the puck assembly 302 and the base assembly 304 to allow both the puck assembly 302 and base assembly 304 to communicate wirelessly with remote devices.

Through their status as wireless nodes 102, the product display assemblies 202 can provide location-awareness for the system 100 with respect which product display assemblies are where and what products they are displaying. However, establishing location-awareness can be a challenge. Base assemblies 304 are typically fixedly secured to surfaces such as counters and walls in a retail store, and the locations of these fixtures can be referred to as post positions. The fixed nature of securing base assemblies 304 to counters or walls makes moving base assemblies 304 to new post positions inconvenient, time-consuming, and labor-intensive. Moreover, with many product display assemblies 202, the puck assemblies 302 can be detachable from the base assembly 304 and/or tether 310 to allow for swapping out puck assemblies 302 and/or their attached electronic devices 206 to new post positions. Given the potential for movement of puck assemblies 302 and/or electronic devices 206 to new post positions, remote location-aware tracking of electronic devices 206 can be a technical challenge.

In this regard, it is highly desirable to remotely track the precise location of products such as electronic devices 206 in a retail store, and more specifically to know which electronic devices 206 are being displayed at which post positions. Merchandisers typically devise detailed planograms (POGs) that will define which types of electronic devices 206 should be displayed at particular post positions in a retail store to achieve desired retail merchandising goals. For example, a merchandiser may want the newest and most expensive model of a particular brand of smart phone displayed at post positions 1-4 (which are expected to experience the most customer traffic), while older or less expensive models of a smart phone are to be displayed at post positions 5-8 (which are expected to experience less customer traffic). Monitoring planogram compliance can be a major burden at retail stores, and it is believed that example embodiments of the system 100 described herein can help facilitate effective remote monitoring of planogram compliance by providing an effective mechanism by which identifiers for electronic devices 206, puck assemblies 302, and base assemblies 304 can be tracked and linked with post positions.

Figure 4A:
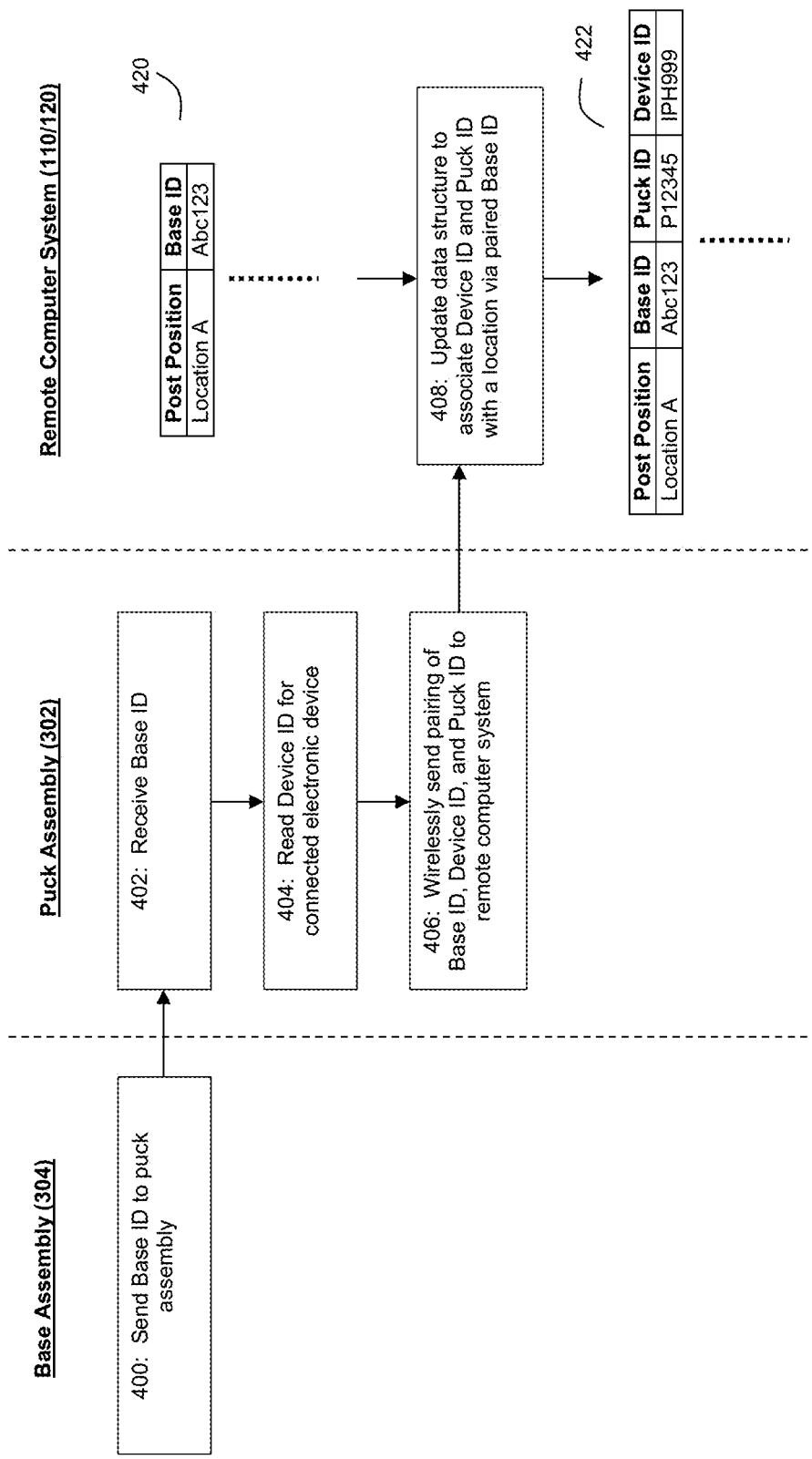
FIGS. 4A-4D show example process flows that leverage wireless communication capabilities of example product display assemblies to provide location-awareness regarding where puck assemblies and electronic devices are located relative to known locations such as post positions.
Figure 4B:
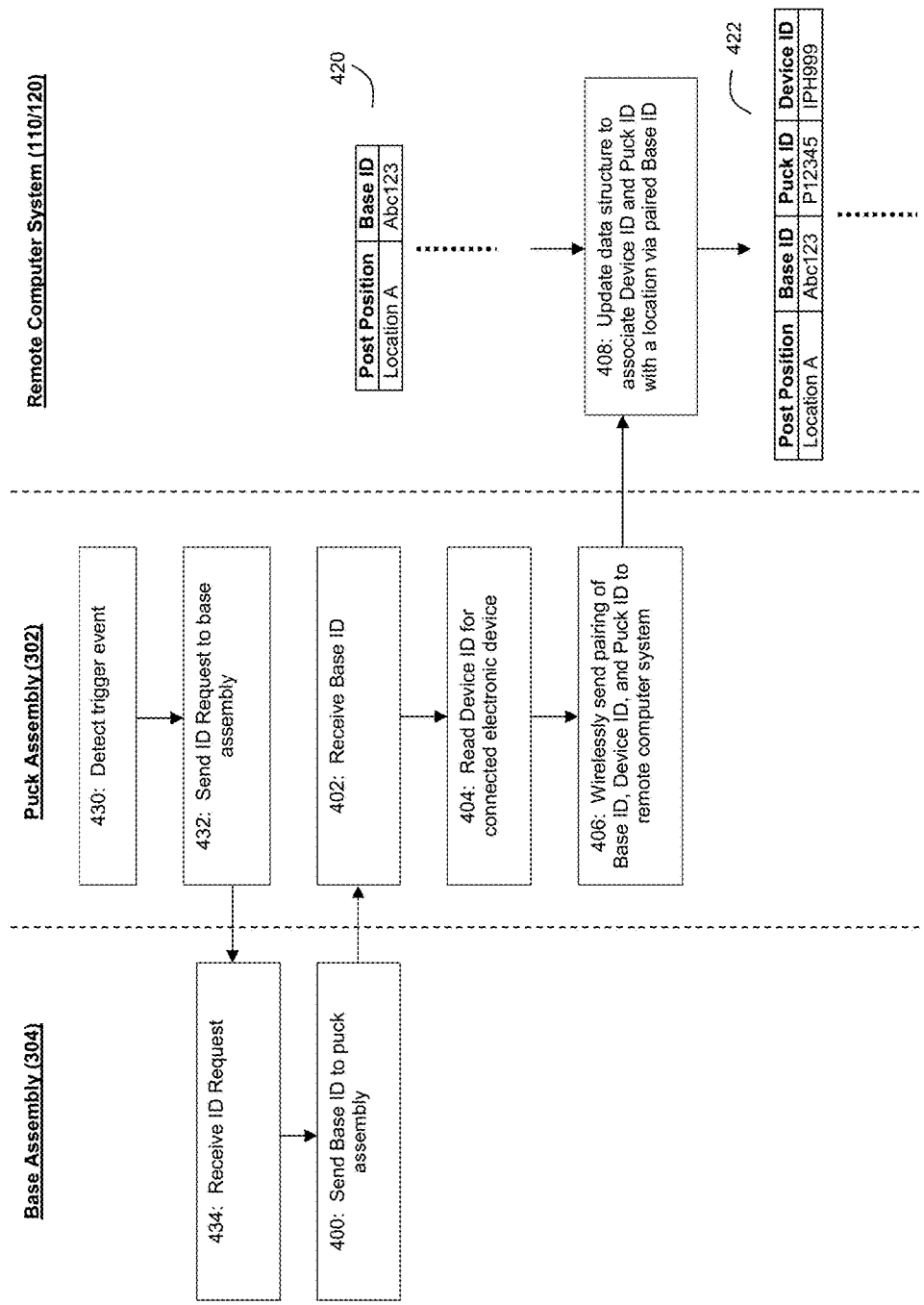
Figure 4C:
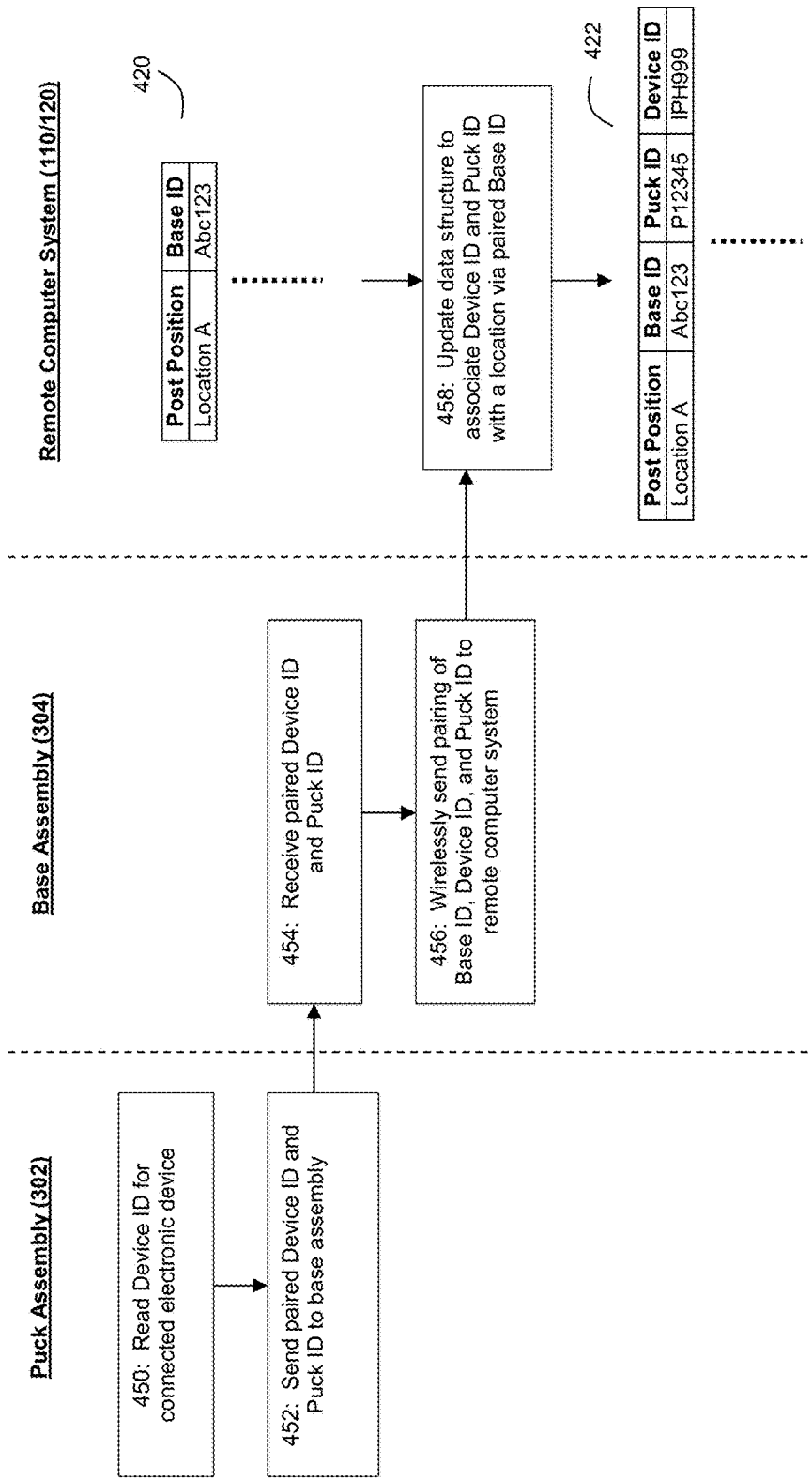
Figure 4D:
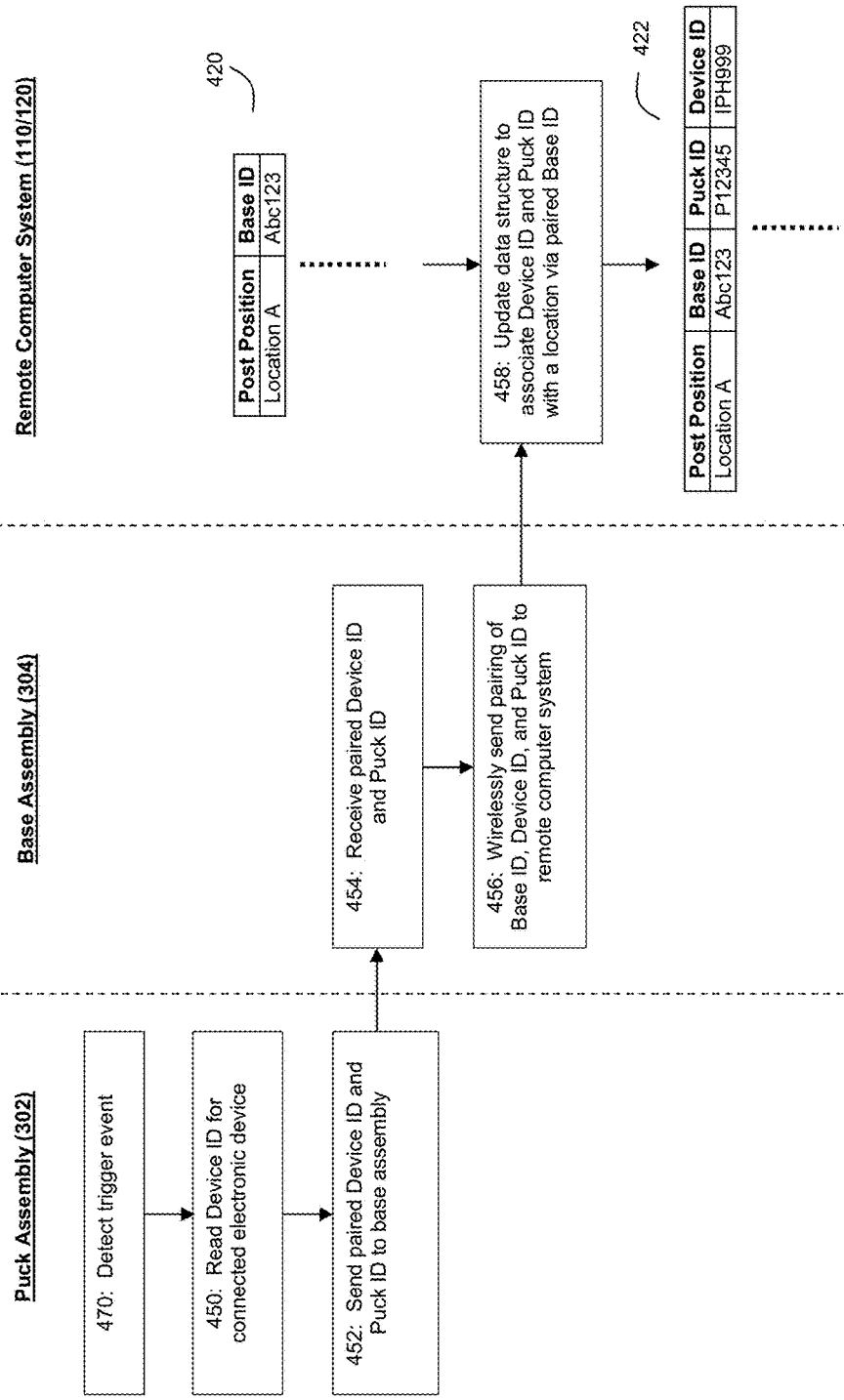

FIGS. 4A-4D show example process flows that leverage the wireless communication capabilities of a product display assembly 202 to provide location-awareness for the system 100 regarding where puck assemblies 302 and electronic devices 206 are located relative to known locations such as post positions. As mentioned above, because base assemblies 304 are expected to be relatively fixed in terms of their locations in retail stores, while puck assemblies 302 and electronic devices 206 may change their locations in the retail store fairly often, the process flows of FIGS. 4A-4D provide practitioners with opportunities for improved location tracking of electronic devices 206 and assessing planogram compliance. FIGS. 4A and 4B show examples where the puck assembly 302 is configured to wirelessly communicate with a remote computer system such as gateway computer 110, while FIGS. 4C and 4D show examples where the base assembly 304 is configured to wirelessly communicate with a remote computer system such as gateway computer 110.

As shown by FIG. 4A, a remote computer system such as gateway computer 110 and/or server 120 can maintain a data structure 420 such as a table that associates identifiers for the base assemblies 304 (e.g., Base IDs) with locations in a store (e.g., post positions) The post positions can be known locations within a planogram for a store, and these locations can be defined with respect to frames of reference defined by a planogram in any of a number of manners. For example, in some instances, a planogram could define post positions in a relative manner that is not true to scale with respect to the spatial geometry of a store (e.g., Post Position 1 is the front row leftmost position on a defined table, Post Position 2 is the front row, second from the left position on the defined table, . . . , Post Position N is the back row, rightmost position on the defined table, etc.). However, other stores may define planograms in a more scaled manner where the post positions are represented with more geographical precision. However, the post positions need not be defined with the precision of GPS coordinates or the like unless desired by a practitioner.

Base assembly 304 can be configured with an identifier that serves to uniquely identify that base assembly 304 within system 100. For example, a different serial number can be assigned to each base assembly and stored in a memory as a Base ID that is accessible to circuitry in the base assembly 304. For example, a microprocessor that can be included as part of the base assembly 304 can come from the factory with a globally unique identification number that is similar in nature to a serial number. This identifier can be etched into the internal memory space of the microprocessor and available for reading out and referencing. Such an identifier can be used as the Base ID in an example embodiment.

The associational data in data structure 420 can be created and stored in the system 100 when base assemblies 304 are installed in a store. Registration can be carried out as a set up operation in software. Uncorrelated positions (e.g., base assemblies that do not have known post positions) can be placed on a software-defined planogram, and then each of these uncorrelated positions can be registered with a post position using a set up process. As base assemblies 304 (or product display assemblies 202 that include puck assemblies 302 and base assemblies 304) start coming online with gateway computer 110, the gateway computer will start seeing data that represents Base IDs (or pairings between Base IDs and identifiers for puck assemblies 302 (Puck IDs)). The gateway computer 110 can then issue wireless commands that correspond to "identify" requests to each of the uncorrelated product display assemblies 202 that will cause a status indicator such as an LED on the subject product display assembly 202 to identify itself (e.g., blink in a certain way). This identification can allow a user to physically identify a given base assembly 304 at a given post position with the uncorrelated Base ID data received by the gateway computer 110, which allows the system to register a given base assembly 304 with a given post position in data structure 420. In another example registration process, post positions can be manually labeled with respective codes or other unique identifiers and base assemblies 304 can be manually labeled with their Base IDs, and a user can manually enter a pairing between these values in the system to create data structure 420.

Once a Base ID has been associated with a post position, the system next needs to learn which puck assembly 302 and/or electronic device 206 is located at that post position. FIG. 4A shows an example process flow for this.

At step 400, the base assembly 304 sends its Base ID to the puck assembly 302. This communication can be accomplished via any of a number of techniques, including data transfers via the electrical signal passed through contacts or wireless transfers if both the puck assembly 302 and base assembly 304 are configured for wireless communication with each other. At step 402, the puck assembly 302 receives this Base ID from the base assembly 304. The puck assembly 302 can also read an identifier for the electronic device 206 (Device ID) that is connected to the puck assembly 302 (step 404). For example, with reference to FIGS. 5A and 5B, this determination can be made by reading data about the electronic device 206 through cable 512. Through this cable 512, the electronic device 206 can provide its Device ID to the puck assembly 302, and this Device ID can identify a make and model for the electronic device (e.g., an Apple iPhone X) as well as a serial number. For example, identifying information about the device 206 can be made available to the puck assembly 302 via a USB interface connection through cable 512. For example, upon connection via cable 512, a device 206 that is a USB device can output data that includes USB device descriptors. Identifying information that can include device type data and a Device ID can be determined from such descriptors. For example, the puck assembly 302 or gateway computer 110 can use base level descriptors that are broadcast in response to connection and also implement USB classes to query the device further e.g., USB image class, USB mass storage device class, etc.).

Receipt of the Device ID allows the puck assembly 302 to pair the Base ID with the Device ID, and this pairing of Base ID with Device ID can be wirelessly sent from the puck assembly 302 to the remote computer system at step 406. The puck assembly 302 may also send its own puck assembly identifier (Puck ID) to the remote computer system at step 406, which would pair the Base ID with the Device ID and the Puck ID. At step 408, the remote computer system receives this pairing of Base ID with Device ID (or Base ID with Device ID and Puck ID), and it updates the data structure to associate the Device ID (or Device ID and Puck ID) with a post position by virtue of the shared Base ID (see data structure 422). Thus, it can be seen that data structure 422 tracks which electronic devices 206 are at which post positions, and it can also track which puck assemblies 302 are at which post positions.

The example of FIG. 4B shows an example where the puck assembly 302 initiates the location-aware pairing operation. At step 430, the puck assembly 302 detects a trigger event, and this trigger event causes the puck assembly 302 to send a request for the base assembly's identifier (Base ID) to the base assembly 304 (step 432). This communication can occur over a similar channel as described in connection with step 400 of FIG. 4A. At step 434, the base assembly 304 receives the ID request and returns the Base ID to the puck assembly 302 (step 400 as described in connection with FIG. 4A). The remaining steps 402, 404, 406, and 408 can be performed as described above in connection with FIG. 4A.

Any of a number of trigger events can be used at step 430 to initiate the operation of pairing the Base ID with the Device ID and/or Puck ID. For example, the trigger event can be anytime that the puck assembly 302 detects a detachment from the base assembly 304 and/or tether 310 (which may indicate movement of the puck assembly 302 to a new post position, in which case the need for re-pairing may arise). The trigger event can also a detection by the puck assembly 302 that it has lost power. Another example of a trigger event can be the detection of a new connection with an electronic device 206 (e.g., via cable 512). Yet another example of a trigger event can be a detection that the puck assembly 302 has been lifted. Yet another example of a trigger event can be an expiration of a timer (which would define a timed basis for triggering the pairing operation so that the system can regular re-pair and confirm which electronic devices 206 are at which post positions). Yet another example of a trigger event can be a command sent from the computer system 110/120 in response to a user request through interface 130 to force a re-pairing.

As mentioned above, FIGS. 4C and 4D show examples where the base assembly 304 is configured to wirelessly communicate with the remote computer system. The example of FIG. 4C can begin at step 4500 with the puck assembly 302 reading the Device ID for its connected electronic device 206 (where this step can be performed in a similar fashion as step 404 from FIGS. 4A and 4B). At step 452, the puck assembly 302 sends the Device ID (or the Device ID paired with the Puck ID) to the base assembly 304. This communication can occur over a similar channel as described in connection with step 400 of FIG. 4A. At step 454, the base assembly 304 receives the Device ID (or the Device ID paired with the Puck ID). Then, at step 406, the base assembly 304 reads its Base ID and sends a pairing of the Base ID with the Device ID (or a pairing of the Base ID with the Device ID and Puck ID) to the remote computer system using its wireless communication capability. At step 458, the remote computer system receives this pairing of Base ID with Device ID (or Base ID with Device ID and Puck ID), and it updates the data structure 420 to associate the Device ID (or Device ID and Puck ID) with a post position by virtue of the shared Base ID (see data structure 422).

The example of FIG. 4D shows an example where the puck assembly's detection of a trigger event at step 470 initiates the pairing operation. The trigger event(s) used at step 470 can be the same as those discussed above in connection with step 430 of FIG. 4B.

Thus, as the process flows of FIGS. 4A, 4B, 4C, and/or 4D are repeated for different product display assemblies 202 in a retail store (or in multiple retail stores), the data structure 422 can allow for highly detailed planogram monitoring in real-time and around the clock, both on a per-retail store basis and on a multi-retail store basis. For example, a software application run by the remote computer system can compare data structure 422 with a planogram. In response to the comparison, the software application can determine whether at least one of the electronic devices 206 is located in an incorrect location. If so, the software application can generate a notification about the incorrect location, and this notification can be delivered to interested parties, such as personnel in the retail store who can move the electronic device to the correct location. Retail store personnel can receive such notifications on their smart phones and/or tablet computers (e.g., via the management user interface 130).

Further still, as customers interact with the product display assembly (such as by lifting a puck assembly 302 to inspect an electronic device 206), these actions can be detected and tracked by the product display assembly 202 and reported to the remote computer system using the techniques described in the above-referenced and incorporated '140 patent. As explained in the above-referenced and incorporated patents and patent applications, circuitry in the puck assembly 302 can be used to detect events such as lifts of the puck assembly. With these prior system designs, data about lift events could be communicated wirelessly via the puck (e.g., via a wireless transmitter in the puck or by using the tether 210 as an RF antenna). Alternately, such data could be communicated over a conductor within the tether 210 itself as a standard signal using the conventional RF signal approaches. The remote computer system can then correlate this lift tracking data with the data structure 422 to reliably know precisely which electronic devices are being inspected at which post positions.

Figure 6:
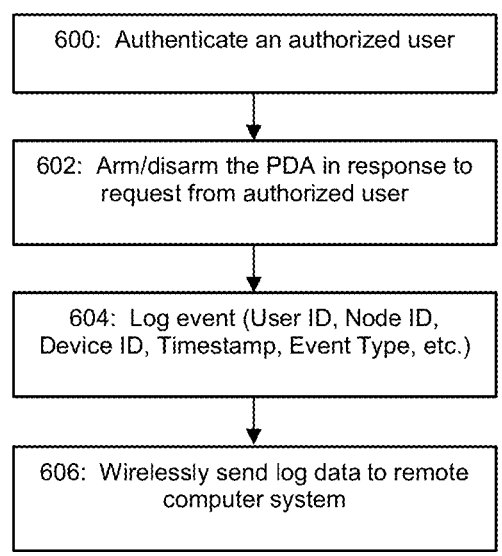
FIG. 6 shows an example process flow for logging arming/disarming actions by users with respect to a product display assembly.

The wireless communication capabilities of the product display assembly 202 can also be used to report other types of information to a remote computer system such as gateway computer 110 and/or server 120. For example, the product display assembly can wirelessly communicate access log data to the gateway computer 110 and/or server 120. The product display assemblies 202 can be designed so that only authorized users are allowed to arm and/or disarm the security features of the product display assemblies 202. Thus, if the product display assembly 202 is in an armed state, a removal of the displayed product (e.g., electronic device 206) can trigger an alarm. However, if the product display assembly 202 is in a disarmed state, the product can be removed from the puck assembly 302 without triggering an alarm. Accordingly, the product display assembly 202 can be controllable so that only authorized users are able to disarm (and arm) the product display assembly 202. Examples of technology that can be used to perform user authorization and authentication are described in U.S. Pat. No. 9,892,604 and U.S. Pat. App. Pub. 2017/0300721, the entire disclosures of which are incorporated herein by reference. The access log data can identify when a given product display assembly was armed/disarmed and by which authorized user. Furthermore, the access log data can also identify the electronic device 206 on display when an arm/disarm event occurred as well as where the product display assembly 202 was located when the arm/disarm event occurred (or the access log data can be correlated with data structure 422 to determine such information). FIG. 6 depicts an example process flow for use by the product display assembly 202 to log access data and report the access data to a remote computer system such as gateway computer 110 and/or server 120.

At step 600, an authorized user who attempts to arm/disarm a product display assembly (PDA) 202 is authenticated. As noted above, U.S. Pat. No. 9,892,604 and U.S. Pat. App. Pub. 2017/0300721 describe technology that can be used to authorize and authenticate users for such tasks. In response to authentication of the authorized user, the PDA 202 can be armed/disarmed as requested. At step 604, the PDA 202 logs event data relating to this arming/disarming. The event data that is logged may include an identifier for the authorized user who was authenticated at step 600 (e.g., each authorized user can be assigned a security fob or the like that includes a unique identifier associated with the user—such an identifier can serve as a User ID, and the authentication process can authenticate the user on the basis of this User ID). The event data may also include an identifier for the PDA 202, which can be referred to as a node identifier (Node ID) given that the PDA 202 in this example is serving as a wireless node 102 within system 100. The Node ID can be a Puck ID, Base ID, or other identifier that serves to uniquely identify a PDA 202 within system 100 (e.g., a combination of Puck ID and Base ID). Further still, the event data may also include an identifier for the product displayed by the PDA 202 (e.g., Device ID), as well as a timestamp for the event (e.g., date and time) and identifier for event type (e.g., arm event, disarm event, etc.). At step 606, the PDA 202 can wirelessly send the logged event data to the remote computer system via wireless network 104.

While the examples of FIGS. 2-4 and 6 describe various operations that can be performed with respect to wireless nodes 102 that correspond to product display assemblies 202, it should be understood that the features of FIGS. 2-4 and 6 could also be performed in connection with any of the other types of wireless nodes 102 within system 100 that are referenced above.

For example, the wireless nodes 102 can correspond to different locks within a retail store. Location awareness operations similar to those described by FIGS. 4A-4D can be performed to track where a given lock is being used. For example, a lock that regulates access to a cabinet can have a unique identifier that is associated with a cabinet location, and to the extent that the locks might be moved to different electronically identifiable cabinets, the FIGS. 4A-4D process flows can be used to pair Lock IDs with Cabinet IDs or the like. An example of an electronically controllable lock that can be configured with a wireless transceiver to serve as a wireless node 102 is described in US Pat. App. Pub. 2015/0048625, which is incorporated herein by reference. Further still, the lock could also be configured with an RFID reader or other sensor that would be capable of detecting RFID-equipped (or other sensible) products being moved into or out of an enclosure such as a cabinet secured by the lock to detect identifiers for such products. Such Product IDs could then be paired with the Lock IDs to track which products are secured by which locks. Also, a process flow similar to that of FIG. 6 can be performed by the lock to log events such as lock/unlock commands from authorized users and then wirelessly share the event log data with a remote computer system such as gateway computer 110 and/or server 120.

As another example, the wireless nodes 102 can correspond to different power strips within a retail store. Location awareness operations similar to those described by FIGS. 4A-4D can be performed to track where a given power strip is being used and whether any products are connected to the power strip. For example, a power strip that is used to power one or more electrical appliances (which may include one or more electronic devices 206) can have a unique identifier (e.g., Strip ID) that is associated with a location in a store, and to the extent that the power strips might be moved to different store locations, the FIGS. 4A-4D process flows can be used to pair Strip IDs with new locations. The power strip can also be configured to provide security functions so that alarms are triggered when the power strip is in an armed state and an electrical appliance is removed from a power outlet on the strip. Examples of such intelligent power strips that can be configured with a wireless transceiver to serve as a wireless node 102 are described in US Pat. App. Pub. 2017/0116832 and U.S. provisional patent application 62/553,770, filed Sep. 1, 2017, and entitled "Power And/Or Alarming Security System for Electrical Appliances", the entire disclosures of which are incorporated herein by reference. Further still, the power strip could also be configured to detect identifiers for electrical appliances powered by the power strip (where these identifiers can serve as Product IDs). Such Product IDs could then be paired with the Strip IDs to track which products are connected with which power strips (or even with which power outlets within which power strips). For example, if the power strip provides DC power to a connected device such as a USB device (e.g., a smart phone or the like), then Product IDs can be determined by the power strip in response to its connection with the device. For a power strip that provides AC power to a connected device (e.g., where the connected device is a television set, vacuum cleaner, etc.), the power strip may be able to categorize the connected device as being a particular type of device based on a profile of its electrical characteristics as measurable by the power strip, and such type information can be used as a Product ID. In another example for AC power strips, a manual process of determining a Product ID for devices connected to the power strip could be used (e.g., a reader such as a bar code reader being used by store personnel to scan a device connected to the strip and obtain a Product ID that can be paired with a power strip identifier (or even a socket identifier of the power strip). Also, a process flow similar to that of FIG. 6 can be performed by the power strip to log events such as arm/disarm commands from authorized users and then wirelessly share the event log data with a remote computer system such as gateway computer 110 and/or server 120.

As yet another example, the wireless nodes 102 can correspond to different shelves or peg hooks within a retail store. Location awareness operations similar to those described by FIGS. 4A-4D can be performed to track where a given shelf or peg hook is being used within a retail store, where identifiers for the shelves and/or peg hooks are associated with locations for those shelves and/or peg hooks via a data structure. Further still, the shelf or hook could also be configured with an RFID reader or other sensor that would be capable of detecting RFID-equipped (or other sensible) products being moved onto the subject shelf or hook to detect identifiers for such products. Such Product IDs could then be paired with Shelf IDs/Hook IDs for the wireless nodes 102 to track which products are on which shelves or hooks. Also, a process flow similar to that of FIG. 6 can be performed by the shelf or hook to log events such as products being added or removed from the shelves/hooks (or events such as arming or disarming if the shelf or hook is capable of being armed/disarmed) and then wirelessly share the event log data with a remote computer system such as gateway computer 110 and/or server 120.

Hybrid Wireless Environment with Different Types of Wireless Nodes:

Further still, in perhaps an even more powerful example embodiment, the system 100 can include multiple different types of wireless nodes 102 within wireless network 104 so that the gateway computer 110 and server 120 can monitor and control a hybrid mix of wireless nodes 102. As an example, the hybrid mix of wireless nodes 102 can include two or more of the following different types of nodes: a product display assembly, a display shelf, a display hook (e.g., a peg hook), a lock, a power outlet, a power strip, an audio/video controller, a camera, a sensor, a status indicator, a docking station, goods, etc.

Figure 7A:
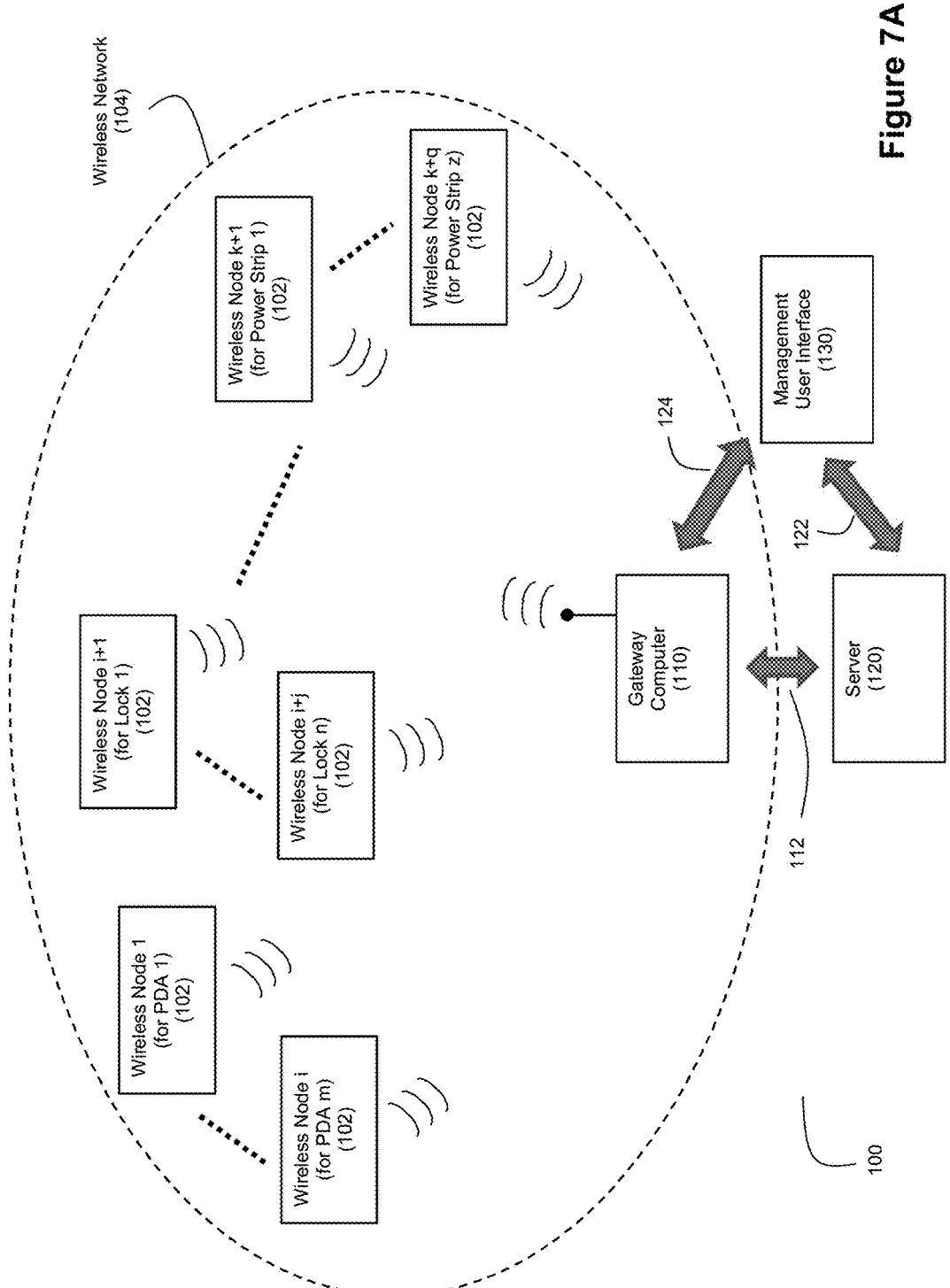
FIG. 7A discloses an example connected environment system that comprises a hybrid mix of different types of wireless nodes.

An example of such a hybrid wirelessly connected environment is shown by FIG. 7A. In this example, the wireless nodes 102 include (1) a plurality of wireless nodes 102 corresponding to product display assemblies (PDAs), (2) a plurality of wireless nodes 102 corresponding to locks, and (3) a plurality of wireless nodes 102 corresponding to power strips. However, it should be understood that the hybrid system may include only two different types of wireless nodes 102. Furthermore, the hybrid system may include different mixes of different types of wireless nodes 102 than those shown by the example of FIG. 7A (e.g., where the system 100 includes wireless nodes 102 corresponding to PDAs and hooks, etc.). A practitioner may choose to include any combination of different types of wireless nodes 102 within system 100.

Figure 7B:
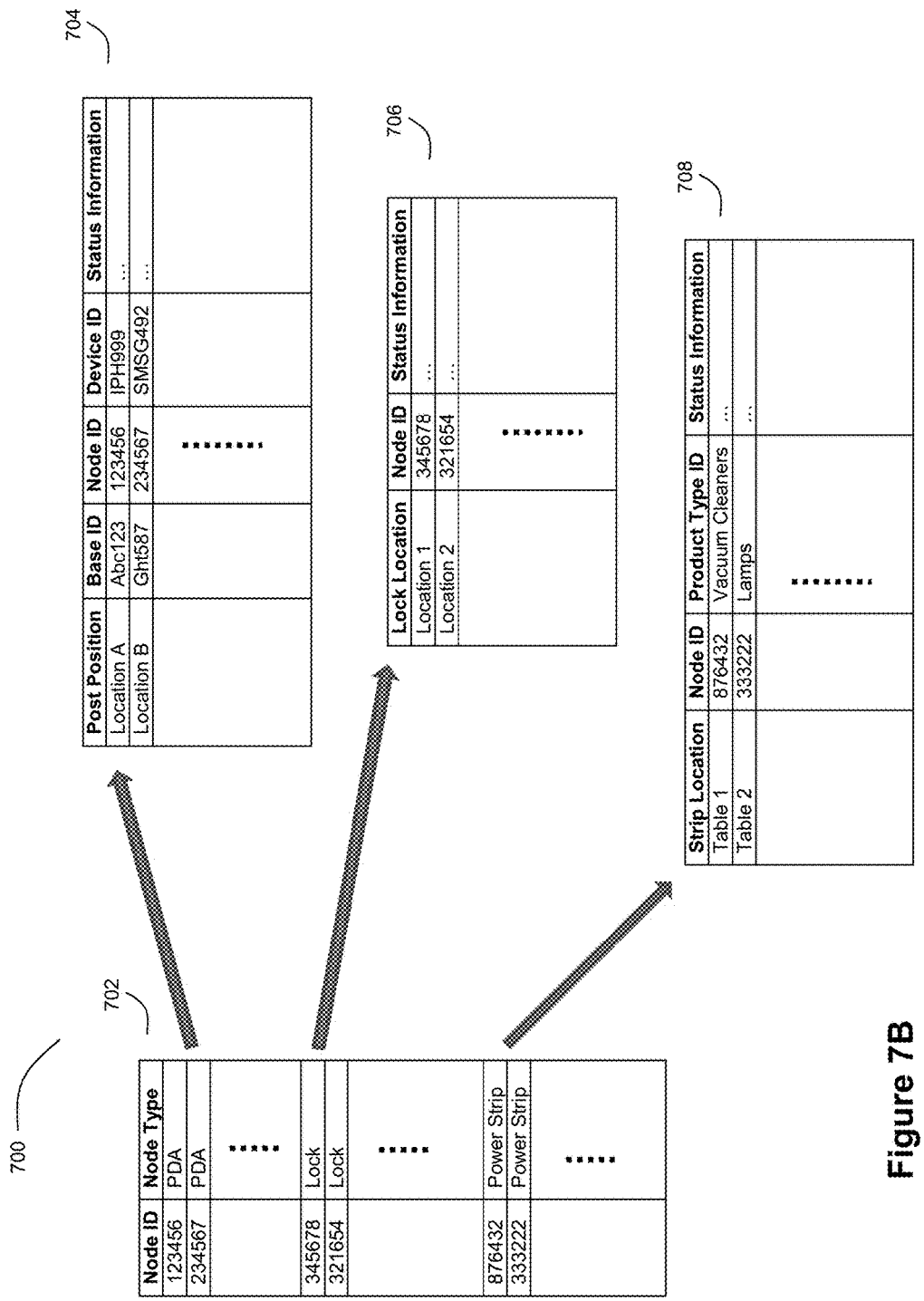
FIG. 7B shows an example data structure use by the example connected environment system of FIG. 7A for tracking and storing data about different types of wireless nodes.

FIG. 7B shows an example data structure 700 that can be employed by the gateway computer 110 and/or server 120 to track data for the different types of wireless nodes 102. A data structure 702 (which may take the form of a table or the like) can associate different identifiers for the wireless nodes 102 (Node IDs) with the appropriate type of node for the wireless node 102 corresponding to the subject Node ID. Thus, Node IDs that correspond to product display assemblies 202 can be associated with a node type that corresponds to product display assemblies 202. Similarly, Node IDs that correspond to locks can be associated with a node type that corresponds to locks, and Node IDs that correspond to hooks can be associated with a node type that corresponds to power strips. Each Node ID for a particular node type can further be associated with data such as data structures 704, 706, and 708.

Data structure 704 comprises additional data that can be associated with wireless nodes 102 corresponding to PDAs. Data structure 704 can include fields similar to those discussed above for data structure 422, and can also include additional status information about each subject Node ID (where in this example, the Node ID can correspond to a Puck ID, although it should be understood that this need not be the case). The data included in such status information can be wirelessly communicated from the wireless nodes 102 to the gateway computer 110 and/or server 120 via the wireless network 104. An example of status information that can be included in data structure 704 comprises an indicator as to whether the subject PDA is currently armed or disarmed. Another example of status information that can be included in data structure 704 comprises access event log data such as described above in connection with FIG. 6 (e.g., logs of who did what and when with respect to the PDA, such as which user badge was used to control the PDA, what code or password was used to arm/disarm, etc.). Another example of status information that can be included in data structure 704 comprises lift data or the like that tracks customer interaction with the PDA (see, for example, FIG. 13G which shows an example GUI that presents data about tracked lifts with respect PDAs in a store). Yet another example of status information that can be included in data structure 704 comprises data that reflects a diagnostic and/or health status for the device corresponding to the subject Device ID (e.g., current status and/or charge level for a battery in the device, a temperature status for the device, etc.). Still more examples of status information that can be included in data structure 704 comprise health and/or diagnostic data about the PDA (e.g., whether is the PDA is charging devices properly, a charge level for a battery included in the puck assembly 302, over-current events, etc.). The status information can also include timestamps for all such data items. Thus, as an example, it should be understood that as different electronic devices 206 are moved to different PDAs, the Device IDs tied to given post positions may change, and the time stamps can allow the system to track such changes which supports forensic auditing of each PDA within the system 100.

Data structure 706 comprises additional data that can be associated with wireless nodes 102 corresponding to locks. Data structure 706 can include fields similar to those discussed above for data structure 422 (where the lock location field serves to identify a location for a given lock in a store, and where the Node ID field serves to identify a particular lock), and can also include additional status information about each subject Node ID (where in this example, the Node ID can correspond to a Lock ID). The data included in such status information can be wirelessly communicated from the wireless nodes 102 to the gateway computer 110 and/or server 120 via the wireless network 104. An example of status information that can be included in data structure 706 comprises an indicator as to whether the subject lock is currently locked or unlocked. Another example of status information that can be included in data structure 706 comprises access event log data such as described above in connection with FIG. 6 (e.g., logs of who did what and when with respect to the lock, such as which user badge was used to control the lock, what code or password was used to lock/unlock, etc.). Another example of status information that can be included in data structure 706 comprises data indicative of the products or type of products that are secured by the subject lock. Still more examples of status information that can be included in data structure 706 comprise health and/or diagnostic data about the lock (e.g., whether is the lock is operating properly, etc.). The status information can also include timestamps for all such data items which supports forensic auditing of each lock within the system 100 (see, for example, FIG. 13F which shows an example GUI that tracks users and their interactions with various locks in a store, where each user can be identified by a name and user identifier code, and where each user's dates/times/durations of interactions with identified locks can be presented).

Data structure 708 comprises additional data that can be associated with wireless nodes 102 corresponding to power strips. Data structure 708 can include fields similar to those discussed above for data structure 422 (where the power strip location field serves to identify a location for a given power strip in a store, where the Node ID field serves to identify a particular power strip, and where the Product Type ID field serves to identify a product type connected to the power strip), and can also include additional status information about each subject Node ID (where in this example, the Node ID can correspond to a Power Strip ID). The data included in such status information can be wirelessly communicated from the wireless nodes 102 to the gateway computer 110 and/or server 120 via the wireless network 104. An example of status information that can be included in data structure 708 comprises an indicator as to whether the subject power strip is currently armed or disarmed (if applicable). Another example of status information that can be included in data structure 708 comprises access event log data such as described above in connection with FIG. 6 (e.g., logs of who did what and when with respect to the power strip, such as which user badge was used to control the power strip, what code or password was used to arm/disarm, etc.) and/or power strip interaction data (such as product removals or additions to the power strip). Another example of status information that can be included in data structure 708 comprises data indicative of the product identifiers such as SKUs that are displayed via the power strip. Still more examples of status information that can be included in data structure 708 comprise health and/or diagnostic data about the power strip (e.g., whether is the power strip is operating properly, etc.). The status information can also include timestamps for all such data items which supports forensic auditing of each power strip within the system 100.

Through data structure 700, the gateway computer 110 and/or server 120 can serve as a common repository and access point for users to monitor and control different types of wireless nodes 102 within an environment such as one or more retail stores. This is a dramatic improvement over conventional systems where any such management if possible at all was occurring through distinct systems such that users were forced to configured, access, and use disparate computer systems that lacked a singular, holistic view of a larger hybrid environment.

Figure 8A:
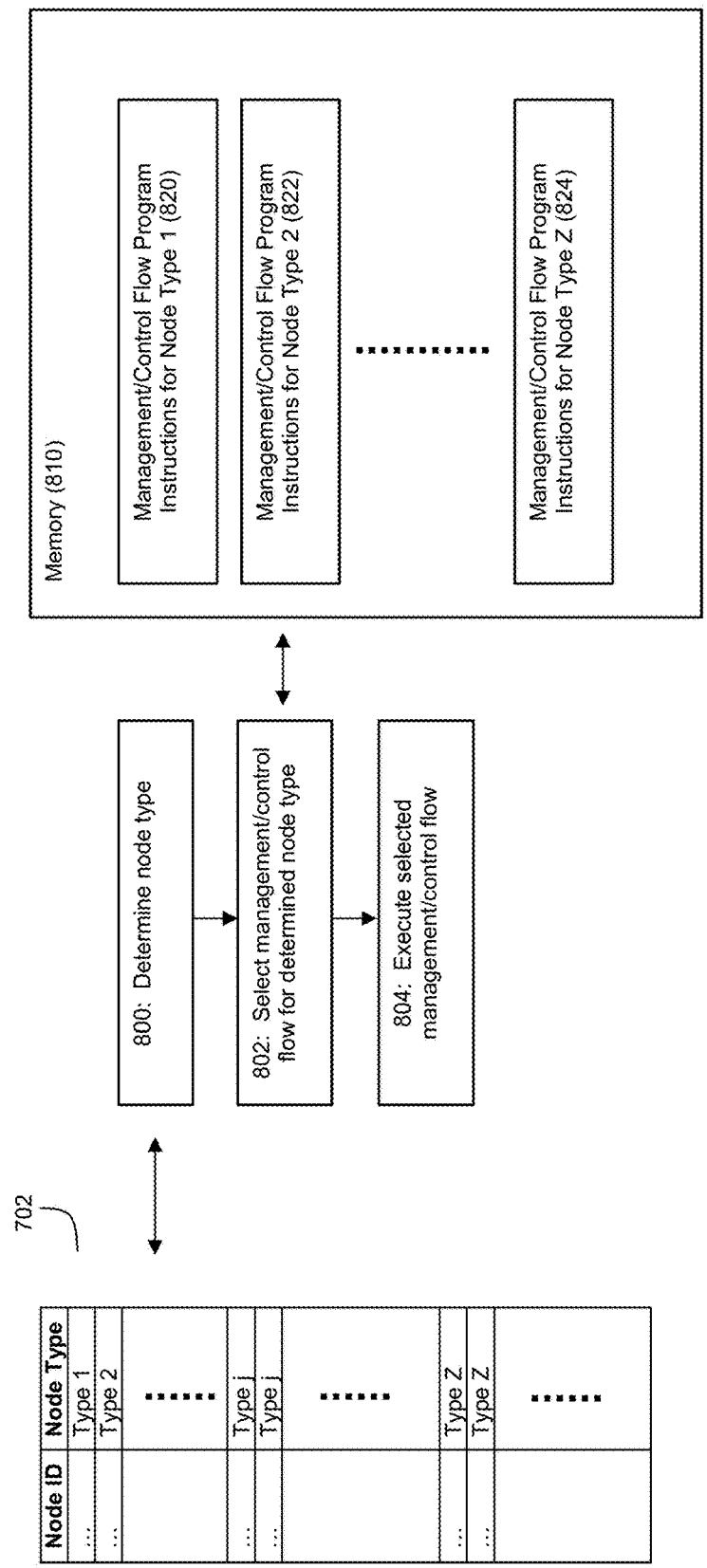
FIG. 8A shows an example process flow for selectively executing node type-specific management/control flows for different types of wireless nodes in the system.

For example, different types of wireless nodes 102 can have different management/control process flows, and because system 100 provides a common repository for data about different types of wireless nodes 102, the system 100 can also support selective execution of appropriate management/control flows for different node types from a common computer system. An example of this is shown by FIG. 8A. FIG. 8A shows a memory 810 that may be part of the gateway computer 110 and/or server 120, where this memory includes different program instructions for different types of wireless nodes 102. For example, the memory 810 may include (1) management/control flow program instructions 820 for a first node type, (2) management/control flow program instructions 822 for a second node type, and (3) management/control flow program instructions 824 for a third node type. A processor of gateway computer 110 and/or server 120 can interact with data structure 702 and memory 810 (where data structure 702 may be stored in memory 810) to perform the process flow of FIG. 8A. At step 800, the processor determines the node type of interest (e.g., a PDA, lock, etc.) At step 802, the processor selects the appropriate management/control flow program instructions for the determined node type from memory 810. At step 804, the processor executes the selected management/control flow program instructions to thereby provide the management and control that is specific to a particular node type, all from a common computer system for the different node types. The instructions for the various management/control process flows can be embodied as a plurality of processor-executable instructions that are resident on a non-transitory computer-readable storage medium (such as memory 810).

Figure 8B:
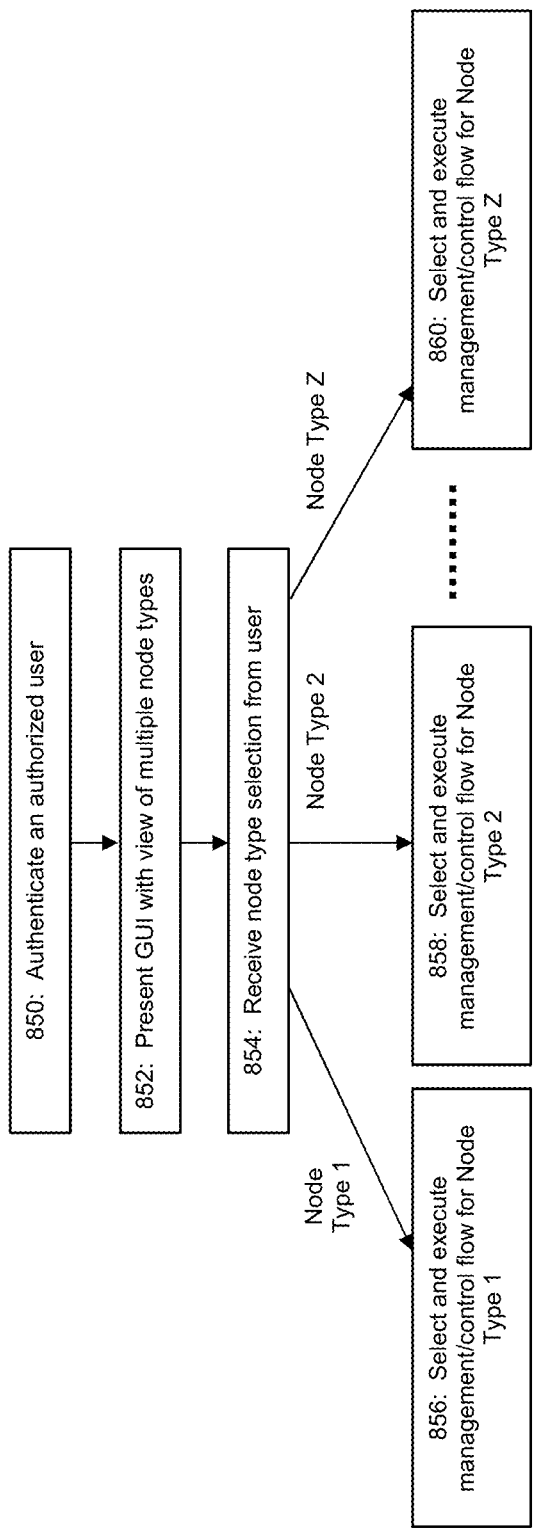
FIG. 8B shows an example of how a common user interface can be used to manage different types of wireless nodes in the system.
Figures 12, 13A:
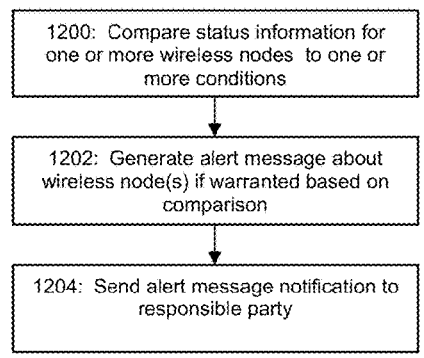
Figure 13B:
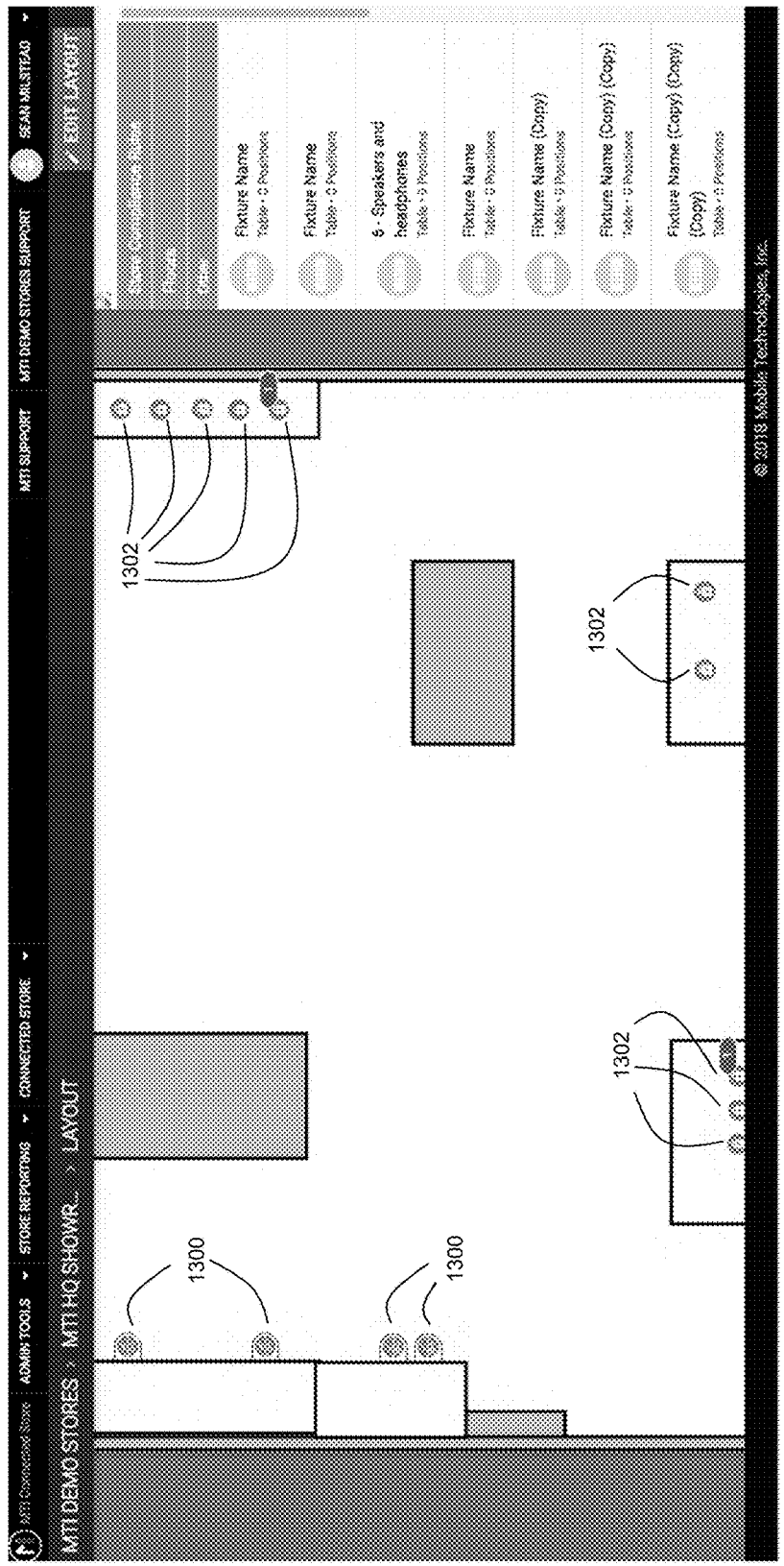

FIG. 8B further shows how such management and control over different node types can be provided from a common user interface. At step 850, a user who is requesting access to system 100 is authenticated to confirm that he or she is an authorized user. As discussed in the above-referenced and incorporated US Pat App Pub 2017/0164314, the system can employ permission levels to restrict a user's access to only data to which he or she is entitled to review or control (e.g., a manager at Store A can have an assigned permission level that allows him or her to access data about wireless nodes in Store A but not data about wireless nodes in Store B; while a regional manager for a chain of stores may get access to data from wireless nodes in the stores encompassed by the manager's region, and so on). After authentication, the system can present the user with a graphical user interface (GUI) that provides a view of multiple type of wireless nodes 102. As an example, such a GUI can be provided through interface 130 and be presented on a tablet computer or the like. FIG. 13A shows an example where a user who is a corporate level user can view a list of stores that include wireless nodes 102 being tracked by the system. In response to user selection of a particular store, a store-specific GUI can be presented. FIG. 13B shows an example of a GUI for a store where different types of wireless nodes 102 are present (see lock nodes 1300 and PDA nodes 1302). If a user is only authorized to view wireless node data for a particular store, then a landing page after authentication for such a user could be a GUI such as that shown by FIG. 13B. In the example of FIG. 13B, This GUI can list or display the different types of wireless nodes 102 that are supported by the system, and the GUI can be responsive to user input (which may include touch input through a touchscreen if the GUI is touchscreen-enabled) to select one or more of the listed node types. At step 854, the system receives a node type selection from the user. At this point, the system can then select and execute the appropriate management/control flow for the selected node type (see, e.g., FIG. 8A). As such, users can be provided with a common interface for managing and controlling different types of wireless nodes 102 within system 100.

Figure 9:
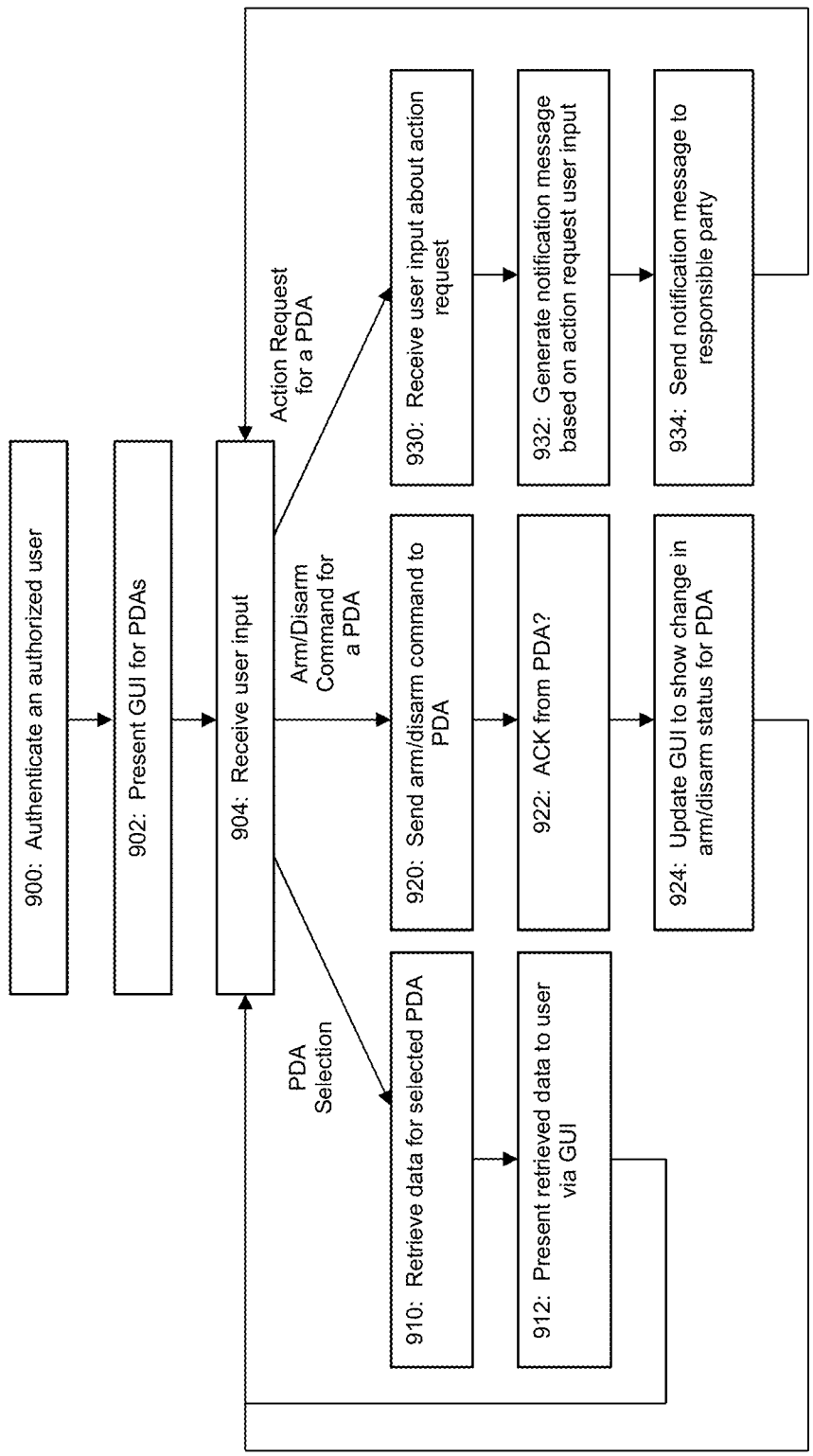
FIG. 9 shows an example process flow for management and control of a wireless node corresponding to a product display assembly.

FIG. 9 shows an example management/control flow with respect to product display assemblies (PDAs) 202 as wireless nodes 102. At step 900, a user is authenticated to confirm that the user is an authorized user. If the FIG. 9 process flow is performed in conjunction with the FIG. 8B process flow (e.g., as part of steps 856, 858, or 860), then it should be understood that step 900 may be omitted as step 850 would have already authenticated the authorized user. However, it should be understood that the FIG. 9 process flow need not only be performed in a hybrid system 100 with different types of wireless nodes 102; the FIG. 9 process flow could also be performed as part of a system 100 where all of the wireless nodes 102 correspond to PDAs 202.

Figure 13C:
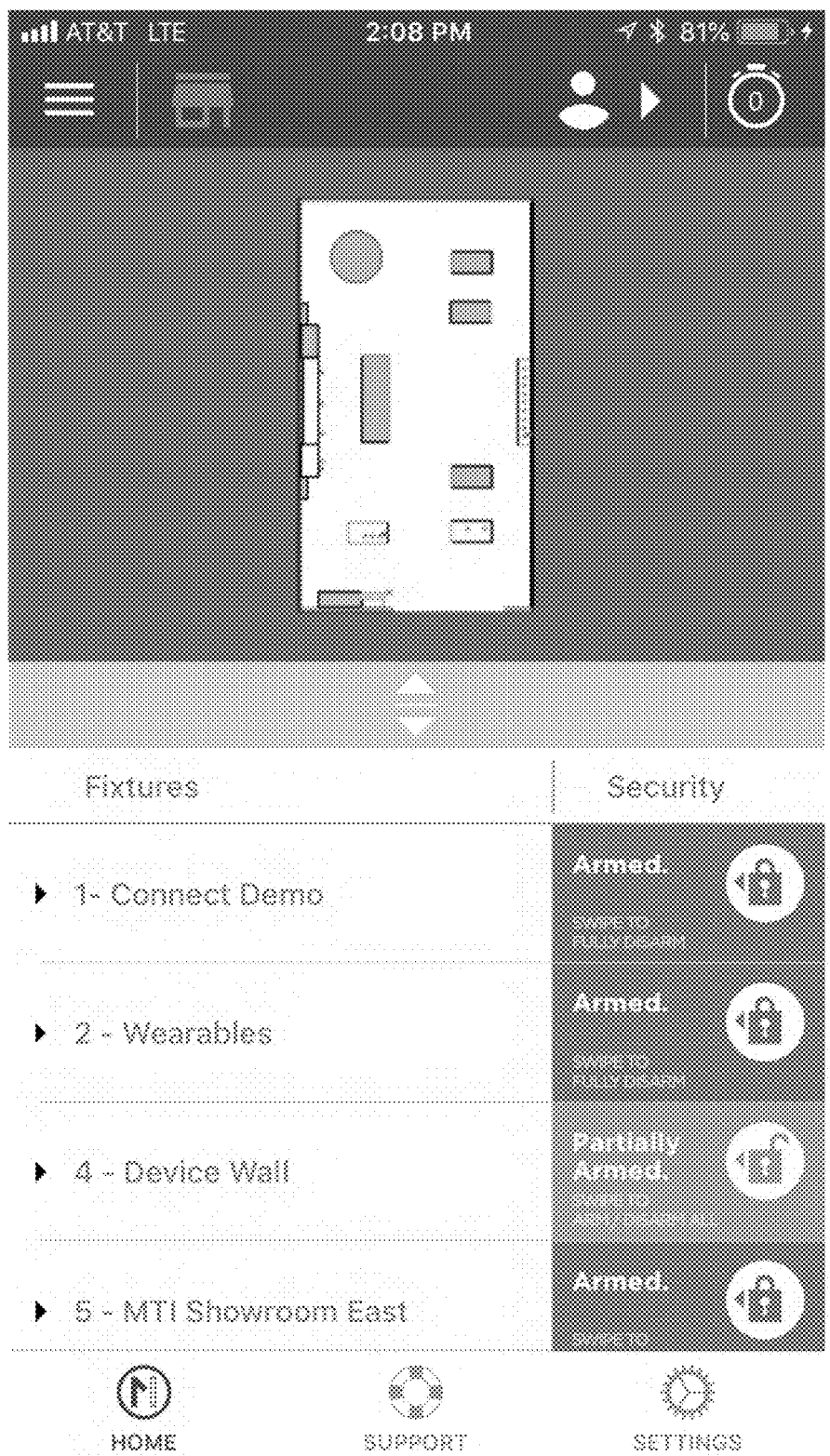
Figure 13D:

At step 902, a GUI is presented to the user that provides the user with a view of the subject PDAs. As an example, if the user is a manager of a particular retail store, this GUI can provide a visual mapping of different PDAs within the retail store. Each PDA can be shown via a graphical icon or the like and be positioned in a spatial arrangement on the GUI having a relationship to the tracked location of that PDA within the store. FIG. 13C shows an example GUI for this. As shown by FIG. 13C, a room with multiple tables and other display location is graphically illustrated in an upper portion of the GUI. The locations of various PDAs within the room can be graphically depicted via colored circles within the room illustration. A list in the lower portion of the GUI can then list different sections of the room. In response to user selection, the GUI can focus in on the selected section (e.g., focusing in on the section labeled "MTI Showroom East"). The GUI also shows a security status for the PDAs in the various sections (and where user input via a swiping action can cause the system to issue an arm/disarm command to the PDAs in a particular section). FIG. 13D shows a GUI that has been focused on a particular section listed in FIG. 13C (which is "MTI Showroom East" in this example). In the GUI of FIG. 13D, a table with multiple PDAs in a particular showroom is presented in the upper portion of the GUI, and each PDA is graphically shown as a circle on a table surface. The lower portion of the GUI lists different tables that are present in the subject showroom. Selection of a listed table can cause the GUI to show table-specific PDAs. The GUI also shows a security status for the PDAs on the various tables (and where user input via a swiping action can cause the system to issue an arm/disarm command to PDAs for the selected section and/or table). The PDAs can also or alternatively be presented as a list of PDAs (e.g., a textual list of PDA 1, PDA 2, etc.), where such a list need not provide any location awareness information. The different PDAs may be identified by their known post positions to make them easily identifiable to users. However, it should be understood that the GUI could sort and list the PDAs using any of a number of different manners of presentation. For example, the list can present PDAs alphabetically. In other example, the list can order the PDAs on the basis of a criticality criteria (e.g., any PDAs showing an alarm status or some other operational anomaly could be bumped higher on the list than PDAs that show normal status). For this type of presentation, tiers of criticality could be used (e.g., tier 1 or "red" warnings for PDAs with an active alarm status, tier 2 or "yellow" warnings for PDAs that show some other anomaly (e.g., see FIG. 13E (which shows a PDA that is flagged for not properly charging a device); or as another example, a PDA being in a disarmed state for longer than a defined threshold), and tier 3 for PDAs that are operating normally. The GUIs may be designed in a fashion that allows the user to selectably control how PDAs are listed or displayed.

The GUI can be configured to accept a variety of different user inputs. For example, each displayed or listed PDA can be selectable by a user (e.g., via a touch input, link selection, etc.). User inputs can also be provided for actions such as arming/disarming one or more PDAs, and requesting some form of action with respect to one or more PDAs (e.g., changing which device 206 is presented by a particular PDA, requesting maintenance for a particular PDA, etc.). At step 904, user input can be received via the GUI.

Figure 13E:
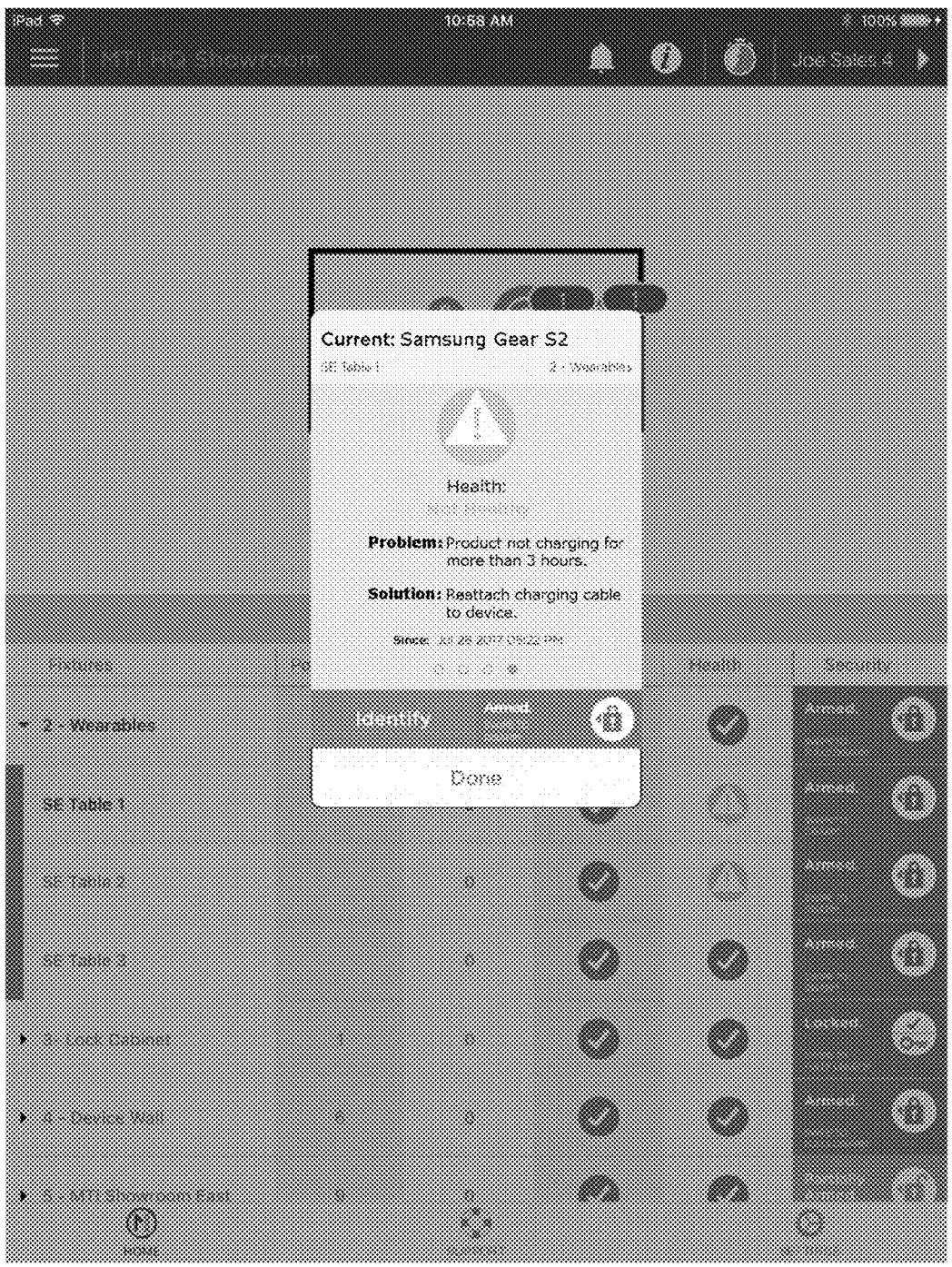
Figure 13F:
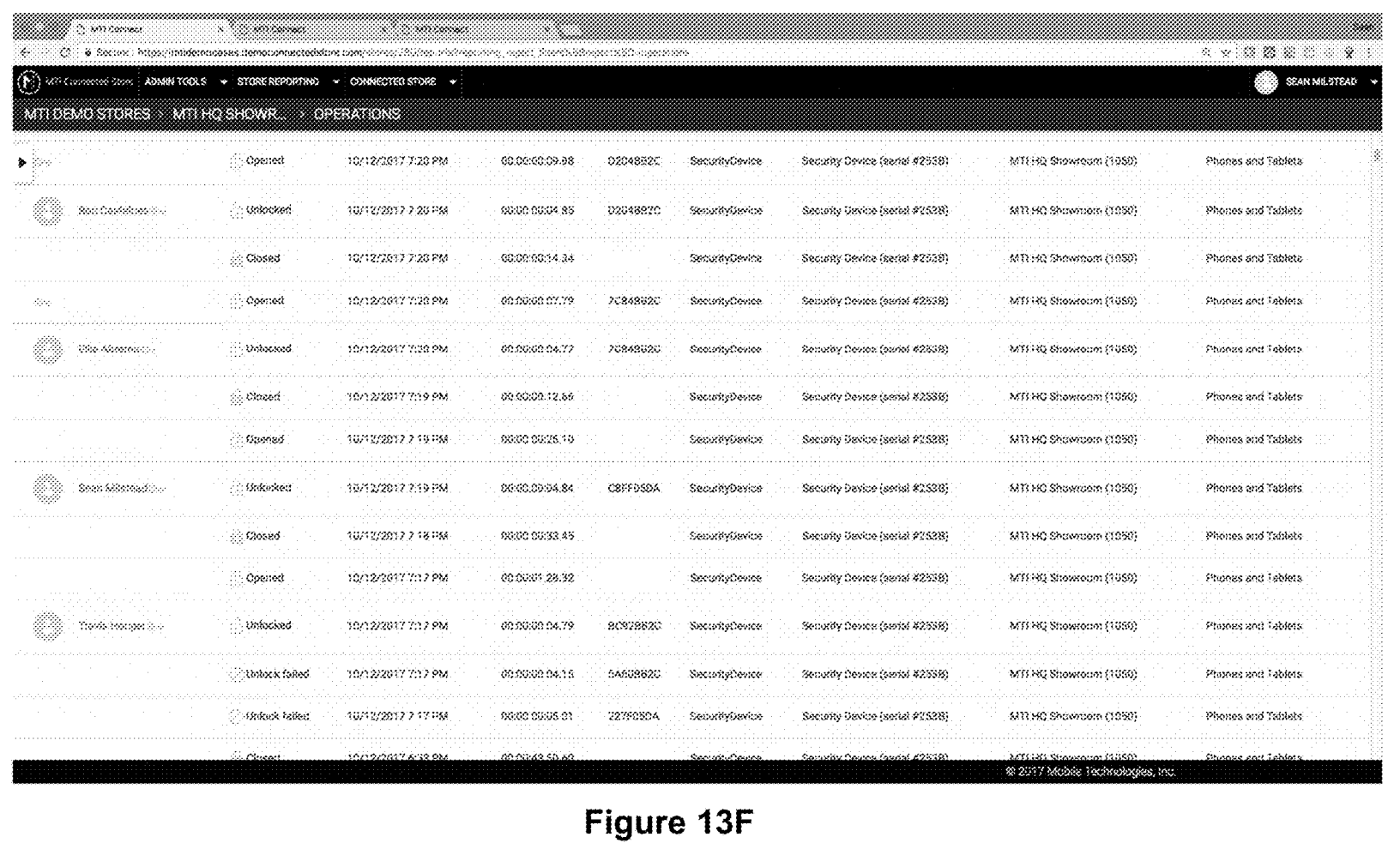
Figure 13G:

If the user input at step 904 corresponds to a selection of a particular PDA, then the process flow can proceed to step 910. At step 910, the system can retrieve data about the selected PDA (e.g., data from data structure 704 for the selected PDA), and this retrieved data can be presented to the user via a GUI. As an example, such a GUI can identify where the subject PDA is located, whether the subject PDA is currently armed/disarmed, what device 206 is connected to the PDA, a current charge level for a battery in device 206, how many customer interactions with the PDA has occurred over some defined time duration, etc.). FIG. 13E shows an example GUI that lists different PDAs, and where a particular PDA that exhibits a charging issue has been selected for presentation to the user. This GUI shows how a detected health condition such as a device not charging properly can be flagged to users. The GUI also shows how the GUI can propose a solution to the identified problem. The "Identify" button in FIG. 13E can be selected by the user to cause the system to wirelessly transmit a command to the subject PDA that will cause a status indicator on the subject PDA to call attention to the subject PDA. This can help a user identify the PDA that needs to be serviced. Such a GUI may also provide an event log history for the subject PDA (or include a selectable button or link for accessing and presenting such a log history). Such a GUI can also be capable of receiving user input that corresponds to a request from the user to arm or disarm the subject PDA. Further still, such a GUI can also be capable of receiving user input that corresponds to an action request with respect to the subject PDA.

If the user input at step 904 corresponds to a request to arm or disarm a PDA, then the process flow can proceed to step 920. At step 920, the system wirelessly sends an arm/disarm command to the subject PDA 202 via gateway computer 110 and the wireless network 104. In example embodiments where the wireless network 104 is arranged as a wireless mesh network, the mesh network can help reliably deliver this command to the subject PDA even if a direct link between the gateway computer 110 and the subject PDA is not available at that time. Given that retail stores are accepted to be noisy signal environments, the mesh network configuration can be particularly advantageous. The PDA 202 can be configured to wirelessly send an acknowledgement message back to the gateway computer 110 in response to receipt of the arm/disarm command to confirm that the command was received and followed. At step 922, the system can check for this acknowledgement message from the subject PDA. If received, the process flow can proceed to step 924 and update the GUI to show a change in the armed/disarmed status for the subject PDA. If no acknowledgement message is received, an error notification can be generated, which may result in an employee being flagged to check on the subject PDA to assess whether the subject PDA is armed or disarmed.

If the user input at step 904 corresponds to an action request for a PDA, then the process flow can proceed to step 930. At step 930, user input can be received through a GUI that defines the nature of the specific action request. For example, the GUI can provide a text entry field through which a user can request that an action be taken such as changing the device 206 that is displayed via a PDA or installing a new puck assembly 302 at the PDA. Similarly, a GUI could provide a menu of selectable predefined action requests (e.g., "Check PDA", "Install New Puck at PDA", etc.). At step 932, the system generates a notification message based on the action request user input from step 930. Then, at step 934, the system sends this notification message to a responsible party so that the action request can be implemented. This message can then be received on a tablet computer, smart phone, or other device carried by the responsible party so that the responsible party can be informed of the need to take the requested action. Thus, the system can also store a data structure that maintains a contact list for different responsible parties (e.g., employees within a retail store), where the system will include an assignment mechanism for assigning action request messages to people on the contact list according to availability data maintained by the system (e.g., who is on shift, etc.).

Figure 10:
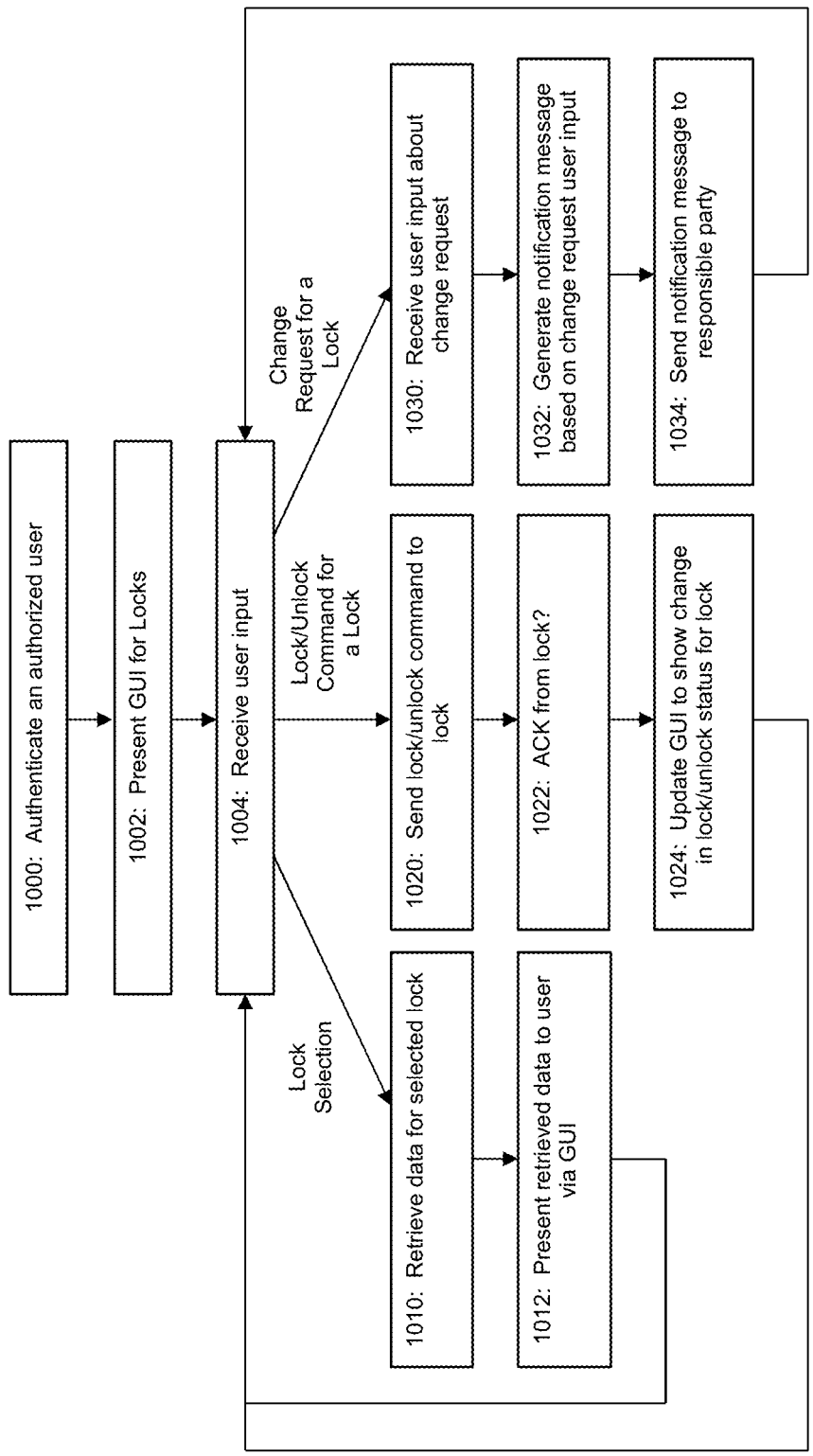
FIG. 10 shows an example process flow for management and control of a wireless node corresponding to a lock.

FIG. 10 shows an example management/control flow with respect to locks as wireless nodes 102. At step 1000, a user is authenticated to confirm that the user is an authorized user. If the FIG. 10 process flow is performed in conjunction with the FIG. 8B process flow (e.g., as part of steps 856, 858, or 860), then it should be understood that step 1000 may be omitted as step 850 would have already authenticated the authorized user. However, it should be understood that the FIG. 10 process flow need not only be performed in a hybrid system 100 with different types of wireless nodes 102; the FIG. 10 process flow could also be performed as part of a system 100 where all of the wireless nodes 102 correspond to locks.

At step 1002, a GUI is presented to the user that provides the user with a view of the subject locks. As an example, if the user is a manager of a particular retail store, this GUI can provide a visual mapping of different locks within the retail store. Each lock can be shown via a graphical icon or the like and be positioned in a spatial arrangement on the GUI having a relationship to the tracked location of that lock within the store. The locks can also or alternatively be presented as a list of locks (e.g., a textual list of Lock 1, Lock 2, etc.). The different locks may be identified by their known lock positions to make them easily identifiable to users (e.g., Cabinet A1, Cabinet A2, etc.). The GUI can be configured to accept a variety of different user inputs. For example, each displayed or listed lock can be selectable by a user (e.g., via a touch input, link selection, etc.). User inputs can also be provided for actions such as locking/unlocking one or more locks, and requesting some form of action with respect to one or more locks (e.g., changing the items within an enclosure protected by a lock, requesting maintenance for a particular lock, etc.). At step 1004, user input can be received via the GUI.

If the user input at step 1004 corresponds to a selection of a particular lock, then the process flow can proceed to step 1010. At step 1010, the system can retrieve data about the selected lock (e.g., data from data structure 706 for the selected lock), and this retrieved data can be presented to the user via a GUI. As an example, such a GUI can identify where the subject lock is located, whether the subject lock is currently locked or unlocked, what items are within an enclosure protected by the lock, etc.). Such a GUI may also provide an access log history for the subject lock (or include a selectable button or link for accessing and presenting such a log history). Such a GUI can also be capable of receiving user input that corresponds to a request from the user to lock or unlock the subject lock. Further still, such a GUI can also be capable of receiving user input that corresponds to an action request with respect to the subject lock.

If the user input at step 1004 corresponds to a request to lock or unlock a lock, then the process flow can proceed to step 1020. At step 1020, the system wirelessly sends a lock/unlock command to the subject lock via gateway computer 110 and the wireless network 104. In example embodiments where the wireless network 104 is arranged as a wireless mesh network, the mesh network can help reliably deliver this command to the subject lock even if a direct link between the gateway computer 110 and the subject lock is not available at that time. Given that retail stores are accepted to be noisy signal environments, the mesh network configuration can be particularly advantageous. The lock can be configured to wirelessly send an acknowledgement message back to the gateway computer 110 in response to receipt of the lock/unlock command to confirm that the command was received and followed. At step 1022, the system can check for this acknowledgement message from the subject lock. If received, the process flow can proceed to step 1024 and update the GUI to show a change in the locked/unlocked status for the subject lock. If no acknowledgement message is received, an error notification can be generated, which may result in an employee being flagged to check on the subject lock to assess whether the subject PDA is locked or unlocked.

If the user input at step 1004 corresponds to an action request for a lock, then the process flow can proceed to step 1030. At step 1030, user input can be received through a GUI that defines the nature of the specific action request. For example, the GUI can provide a text entry field through which a user can request that an action be taken such as changing the item(s) within the enclosure protected by the subject lock. Similarly, a GUI could provide a menu of selectable predefined action requests (e.g., "Check Lock", "Install Lock", etc.). At step 1032, the system generates a notification message based on the action request user input from step 1030. Then, at step 1034, the system sends this notification message to a responsible party so that the action request can be implemented. This message can then be received on a tablet computer, smart phone, or other device carried by the responsible party so that the responsible party can be informed of the need to take the requested action. Thus, the system can also store a data structure that maintains a contact list for different responsible parties (e.g., employees within a retail store), where the system will include an assignment mechanism for assigning action request messages to people on the contact list according to availability data maintained by the system (e.g., who is on shift, etc.).

Figure 11:
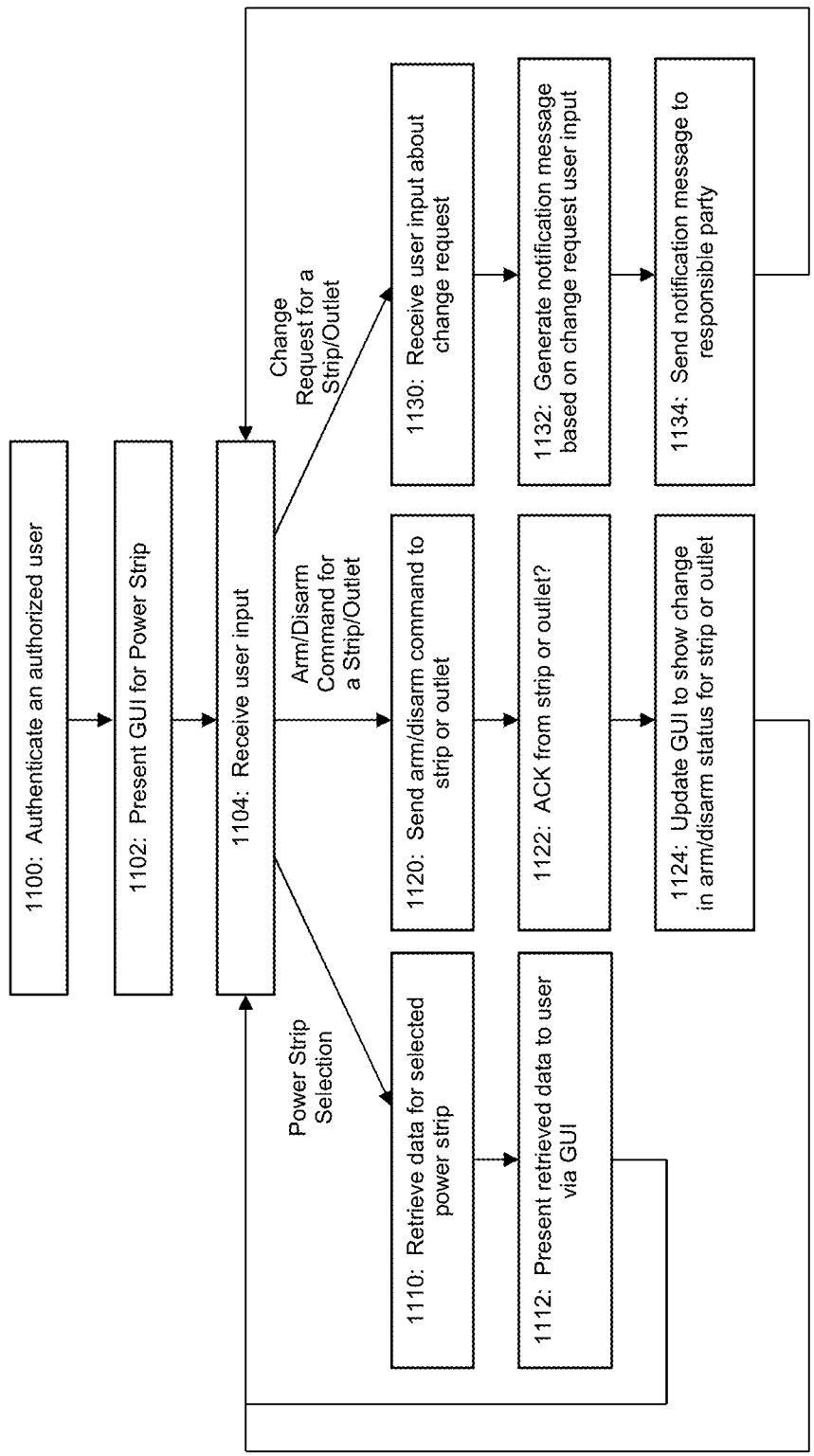
FIG. 11 shows an example process flow for management and control of a wireless node corresponding to a power strip.

FIG. 11 shows an example management/control flow with respect to power strips as wireless nodes 102. At step 1100, a user is authenticated to confirm that the user is an authorized user. If the FIG. 11 process flow is performed in conjunction with the FIG. 8B process flow (e.g., as part of steps 856, 858, or 860), then it should be understood that step 1100 may be omitted as step 850 would have already authenticated the authorized user. However, it should be understood that the FIG. 11 process flow need not only be performed in a hybrid system 100 with different types of wireless nodes 102; the FIG. 11 process flow could also be performed as part of a system 100 where all of the wireless nodes 102 correspond to power strips.

At step 1102, a GUI is presented to the user that provides the user with a view of the subject power strips. As an example, if the user is a manager of a particular retail store, this GUI can provide a visual mapping of different power strips within the retail store. Each power strip can be shown via a graphical icon or the like and be positioned in a spatial arrangement on the GUI having a relationship to the tracked location of that power strip within the store. The power strips can also or alternatively be presented as a list of power strips (e.g., a textual list of Power Strip 1, Power Strip 2, etc.). The different power strips may be identified by their known store positions to make them easily identifiable to users (e.g., Table 1, Table 2, etc.). The GUI can be configured to accept a variety of different user inputs. For example, each displayed or listed power strip can be selectable by a user (e.g., via a touch input, link selection, etc.). User inputs can also be provided for actions such as arming/disarming one or more power strips (and/or individual power outlets on power strips), and requesting some form of action with respect to one or more power strips (e.g., changing which electrical appliance is connected to a power strip, requesting maintenance for a particular power strip, etc.). At step 1104, user input can be received via the GUI.

If the user input at step 1104 corresponds to a selection of a particular power strip, then the process flow can proceed to step 1110. At step 1110, the system can retrieve data about the selected power strip (e.g., data from data structure 708 for the selected power strip), and this retrieved data can be presented to the user via a GUI. As an example, such a GUI can identify where the subject power strip is located, whether the subject power strip is currently armed/disarmed, what electrical appliances are connected to the power strip (if such information is available for the strip), etc.). Such a GUI could be similar in nature to those shown for PDAs with respect to FIGS. 13C and 13D. Such a GUI may also provide an event log history for the subject power strip (or include a selectable button or link for accessing and presenting such a log history). Such a GUI can also be capable of receiving user input that corresponds to a request from the user to arm or disarm the subject power strip. Further still, such a GUI can also be capable of receiving user input that corresponds to an action request with respect to the subject power strip.

If the user input at step 1104 corresponds to a request to arm or disarm a power strip, then the process flow can proceed to step 1120. In an example embodiment, this command can be applicable to a power strip as a whole. However, in another example embodiment, this command can be specific to an individual power outlet within a power strip. At step 1120, the system wirelessly sends an arm/disarm command to the subject power strip via gateway computer 110 and the wireless network 104. In example embodiments where the wireless network 104 is arranged as a wireless mesh network, the mesh network can help reliably deliver this command to the subject power strip even if a direct link between the gateway computer 110 and the subject power strip is not available at that time. Given that retail stores are accepted to be noisy signal environments, the mesh network configuration can be particularly advantageous. The power strip can be configured to wirelessly send an acknowledgement message back to the gateway computer 110 in response to receipt of the arm/disarm command to confirm that the command was received and followed. At step 1122, the system can check for this acknowledgement message from the subject power strip. If received, the process flow can proceed to step 1124 and update the GUI to show a change in the armed/disarmed status for the subject power strip. If no acknowledgement message is received, an error notification can be generated, which may result in an employee being flagged to check on the subject power strip to assess whether the subject power strip (or specific power outlet in the subject power strip) is armed or disarmed.

If the user input at step 1104 corresponds to an action request for a power strip, then the process flow can proceed to step 1130. At step 1130, user input can be received through a GUI that defines the nature of the specific action request. For example, the GUI can provide a text entry field through which a user can request that an action be taken such as changing an electrical appliance that is connected to the power strip. Similarly, a GUI could provide a menu of selectable predefined action requests (e.g., "Check Power Strip", "Remove Power Strip", etc.). At step 1132, the system generates a notification message based on the action request user input from step 1130. Then, at step 1134, the system sends this notification message to a responsible party so that the action request can be implemented. This message can then be received on a tablet computer, smart phone, or other device carried by the responsible party so that the responsible party can be informed of the need to take the requested action. Thus, the system can also store a data structure that maintains a contact list for different responsible parties (e.g., employees within a retail store), where the system will include an assignment mechanism for assigning action request messages to people on the contact list according to availability data maintained by the system (e.g., who is on shift, etc.).

While FIGS. 9-11 show examples of management/control flows for different types of wireless nodes 102, it should be understood that such management/control flows could be designed to perform different tasks if desired by a practitioner. Furthermore, while FIGS. 9-11 show examples of management/control flows for PDAs, locks, and power strips respectively, it should be understood that similar management/control flows can be implemented for other types of wireless nodes 102 (e.g., peg hooks, shelves, etc.).

FIG. 12 shows an example process flow for alert generation with respect to a wireless node 102 in the system 100. Such a process flow can be executed by gateway computer 110 and/or server 120 automatically as new data is received from wireless nodes 102, or it can be executed on demand in response to user requests. At step 1200, the system compares the status information for a wireless node 102 with one or more conditions. An example of such conditions could be planogram data for PDAs 202 in a store. The planogram data can identify which post positions are slated to display which device types. Step 1200 can compare the data in data structure 422/704 with such planogram data to assess planogram compliance. Another example of such conditions could be a battery charge threshold for a battery of an electronic device 206 displayed via a PDA 202. Step 1200 can compare battery status data that may be present in table 704 with the threshold to assess whether any electronic devices 206 are under-charged. Such an under-charge scenario could indicate that a maintenance need exists. Yet another example of such conditions could be a temperature threshold for a battery of an electronic device 206 displayed via a PDA 202. Step 1200 can compare temperature data that may be present in table 704 with the threshold to assess whether any electronic devices 206 are running hot. If so, it may be desirable to disconnect the electronic device 206 from power. As yet another example, the condition could be a time threshold that is used to assess whether a PDA has been left unarmed for too long or whether a lock has been left unlocked for too long. These are just some examples of various conditions that could be tested at step 1200. At step 1202, the system generates an alert message about the wireless node(s) 102 in question if the comparison at step 1200 indicates that an alert is needed. This alert message can identify the subject wireless node(s) and location as well as the nature of the issue that triggered the alert (e.g., POG non-compliance, unlocked for too long, etc.). At step 1204, the system sends the alert message as a notification to a responsible party. The alert notification message can then be received on a tablet computer, smart phone, or other device carried by the responsible party so that the responsible party can be informed about the alert. As noted above, the system can also store a data structure that maintains a contact list for different responsible parties (e.g., employees within a retail store), and the system can include an assignment mechanism for assigning alert notification messages to people on the contact list according to availability data maintained by the system (e.g., who is on shift, etc.).

While the invention has been described above in relation to its example embodiments, various modifications may be made thereto that still fall within the invention's scope. Such modifications to the invention will be recognizable upon review of the teachings herein.

What is claimed is:

1. A system comprising:
a plurality of wireless nodes arranged as a wireless network, wherein each of a plurality of the wireless nodes includes a wireless transceiver for wireless communication over the wireless network, and wherein a plurality of the wireless nodes are part of different product display assemblies, each product display assembly configured to connect with a product for presentation of the product to a consumer; and
a computer system configured for wireless communication with the wireless network;
wherein each of a plurality of the product display assemblies is configured to wirelessly transmit data to the computer system via the wireless network that pairs an identifier for the product display assembly with an identifier for the product; and
wherein the computer system is further configured to (1) receive the wirelessly transmitted data via the wireless network, (2) store data that identifies a location for each of a plurality of the product display assemblies in association with identifiers for the product display assemblies, and (3) create a data structure based on the received data and the stored data, wherein the data structure tracks locations for the products based on the pairings between product display identifiers and product identifiers and the associations between locations and product display identifiers.

2. The system of claim 1, wherein the wireless network comprises a wireless mesh network.

3. The system of claim 1, wherein each of a plurality of the product display assemblies comprises (1) a puck assembly configured to connect with the product, and (2) a base assembly, wherein the puck assembly is removable from the product display assembly;
wherein the puck assembly has an associated puck identifier;
wherein the base assembly has an associated base identifier;
wherein the stored data associates the base identifiers with the locations for the product display assemblies;
wherein the puck assembly is configured to read a product identifier from the connected product;
wherein the product display assembly is configured to wirelessly transmit data that identifies a pairing of the puck identifier, base identifier, and read product identifier to the computer system via the wireless network; and
wherein the computer system is further configured to create the data structure the tracks the product locations based on the pairing data and the associations between the base identifiers and locations.

4. The system of claim 3, wherein a plurality of the puck assemblies include a plurality of the wireless transceivers.

5. The system of claim 3, wherein a plurality of the base assemblies include a plurality of the wireless transceivers.

6. The system of claim 3, wherein each of a plurality of the puck assemblies is adapted to be moveable between (1) a rest position in which the puck assembly rests on the base assembly, and (2) a lift position in which the puck assembly does not rest on the base assembly.

7. The system of claim 3, wherein each of a plurality of the product display assemblies further comprises a tether assembly configured to connect the puck assembly with the base assembly, even when the puck assembly is in the lift position.

8. The system of claim 3, wherein each of a plurality of the product display assemblies is further configured to perform the read operation and the wireless transmission operation in response to a trigger event.

9. The system of claim 8, wherein the trigger event comprises a lift of the puck assembly.

10. The system of claim 8, wherein the trigger event comprises a loss of power to the product display assembly.

11. The system of claim 8, wherein the trigger event comprises a new connection of a different puck assembly with the product display assembly.

12. The system of claim 8, wherein the trigger event comprises a new connection of a different product with the product display assembly.

13. The system of claim 1, wherein the product display assembly is configured to be controllably switched between an armed state and a disarmed state.

14. The system of claim 13, wherein the computer system is configured to wirelessly transmit a command to at least one of the product display assemblies through the wireless network in response to user input through an interface, wherein the command comprises a command to perform at least one of a remote arming and a remote disarming of the at least one product display assembly.

15. The system of claim 1, wherein the wirelessly transmitted data further comprises status information about the product display assembly, and wherein the computer system is configured to store the status information in association with the product display assembly identifier corresponding to the status information.

16. The system of claim 15, wherein the status information comprises an event log for the product display assembly.

17. The system of claim 1, wherein the computer system is further configured to compare the created data structure with planogram data to determine planogram compliance data.

18. The system of claim 1, wherein the computer system comprises a gateway computer.

19. The system of claim 18, wherein the computer system further comprises a server for network communication with the gateway computer, wherein the server is further configured to communicate over a network with a plurality of the gateway computers and a plurality of the wireless networks that are dispersed across a plurality of geographic locations, the server configured to aggregate the created data structures from the different wireless networks.

20. The system of claim 1, wherein the computer system comprises a server.

21. The system of claim 1, wherein the products comprise a plurality of electronic devices.

22. The system of claim 1, wherein the wireless nodes are located in a retail store.

23. A method comprising:
associating an identifier for a product display assembly with a location, the product display assembly comprising a wireless transceiver;
the product display assembly determining a product identifier for a product connected to the product display assembly;
the product display assembly wirelessly transmitting data that is indicative of a pairing between the product display assembly identifier and the determined product identifier to a remote computer system via the wireless transceiver;
the remote computer system building a data structure that associates the determined product identifier with the location based on the association between the product display identifier and the location and the pairing data; and
repeating the method steps with respect to a plurality of different products and product display assemblies that are arranged to form a wireless network of product display assemblies so that the data structure tracks locations of a plurality of different products connected to the product display assemblies;
wherein each of a plurality of the product display assemblies comprises (1) a puck assembly that connects with the product for that product display assembly, wherein the puck assembly has an associated puck identifier, and (2) a base assembly, wherein the base assembly has an associated base identifier, and wherein the puck assembly is removable from the product display assembly;
wherein the associating step comprises associating the base identifiers with the locations;
wherein the determining step comprises the puck assemblies reading the product identifiers from their connected products;
wherein the wirelessly transmitting step comprises each of a plurality of the product display assemblies wirelessly transmitting data that is indicative of a pairing between the puck identifier, base identifier, and read product identifier to the remote computer system via the wireless network; and
wherein the building step comprises the remote computer system building the data structure the tracks the product locations based on the pairing data and the associations between the base identifiers and locations.

24. The method of claim 23, wherein the wireless network comprises a wireless mesh network.

25. The method of claim 23, further comprising:
a product display assembly detecting a trigger event; and
wherein the product display assembly that detects the trigger events performs the determining and wirelessly transmitting step in response to the detected trigger event.

26. The method of any 25, wherein the trigger event comprises a new connection of a different puck assembly with the product display assembly.

27. The method of claim 25, wherein the trigger event comprises a new connection of a different product with the product display assembly.

28. The method of claim 23, further comprising:
the remote computer system comparing the data structure with planogram data to determine planogram compliance data.

29. A system comprising:
a plurality of wireless nodes, wherein each of a plurality of the wireless nodes includes a wireless transceiver, and wherein a plurality of the wireless nodes are part of different product display assemblies, each product display assembly configured to connect with a product for presentation of the product to a consumer; and
a plurality of processor-executable instructions that are resident on a non-transitory computer-readable storage medium, the instructions configured for execution by a processor to cause the processor to communicate with the wireless transceivers of the wireless nodes over a wireless network;
wherein each of a plurality of the product display assemblies is configured to wirelessly transmit data via the wireless network that pairs an identifier for the product display assembly with an identifier for the product; and
wherein the instructions are further configured for execution to cause the processor to (1) receive the wirelessly transmitted data via the wireless network, (2) store data that identifies a location for each of a plurality of the product display assemblies in association with identifiers for the product display assemblies, and (3) create a data structure based on the received data and the stored data, wherein the data structure tracks locations for the products based on the pairings between product display identifiers and product identifiers and the associations between locations and product display identifiers.

30. The system of claim 29, wherein the wireless network comprises a wireless mesh network.

31. The system of claim 29, wherein each of a plurality of the product display assemblies comprises (1) a puck assembly configured to connect with the product, and (2) a base assembly, wherein the puck assembly is removable from the product display assembly;
wherein the puck assembly has an associated puck identifier;
wherein the base assembly has an associated base identifier;
wherein the stored data associates the base identifiers with the locations for the product display assemblies;
wherein the puck assembly is configured to read a product identifier from the connected product;
wherein the product display assembly is configured to wirelessly transmit data that identifies a pairing of the puck identifier, base identifier, and read product identifier to the computer system via the wireless network; and
wherein the instructions are further configured for execution to cause the processor to create the data structure the tracks the product locations based on the pairing data and the associations between the base identifiers and locations.

32. The system of claim 31, wherein a plurality of the puck assemblies include a plurality of the wireless transceivers.

33. The system of claim 31, wherein a plurality of the base assemblies include a plurality of the wireless transceivers.

34. The system of claim 31, wherein each of a plurality of the puck assemblies is adapted to be moveable between (1) a rest position in which the puck assembly rests on the base assembly, and (2) a lift position in which the puck assembly does not rest on the base assembly.

35. The system of claim 31, wherein each of a plurality of the product display assemblies further comprises a tether assembly configured to connect the puck assembly with the base assembly, even when the puck assembly is in the lift position.

36. The system of claim 31, wherein each of a plurality of the product display assemblies is further configured to perform the read operation and the wireless transmission operation in response to a trigger event.

37. The system of claim 36, wherein the trigger event comprises a lift of the puck assembly.

38. The system of claim 36, wherein the trigger event comprises a loss of power to the product display assembly.

39. The system of claim 36, wherein the trigger event comprises a new connection of a different puck assembly with the product display assembly.

40. The system of claim 36, wherein the trigger event comprises a new connection of a different product with the product display assembly.

41. The system of claim 29, wherein the product display assembly is configured to be controllably switched between an armed state and a disarmed state.

42. The system of claim 41, wherein the instructions are further configured for execution to cause the processor to wirelessly transmit a command to at least one of the product display assemblies through the wireless network in response to user input through an interface, wherein the command comprises a command to perform at least one of a remote arming and a remote disarming of the at least one product display assembly.

43. The system of claim 29, wherein the wirelessly transmitted data further comprises status information about the product display assembly, and wherein the instructions are further configured for execution to cause the processor to store the status information in association with the product display assembly identifier corresponding to the status information.

44. The system of claim 43, wherein the status information comprises an event log for the product display assembly.

45. The system of claim 29, wherein the instructions are further configured for execution to cause the processor to compare the created data structure with planogram data to determine planogram compliance data.

46. The system of claim 29, wherein the instructions are configured for execution on a gateway computer.

47. The system of claim 46, further comprising a server for network communication with the gateway computer, wherein the server is further configured to communicate over a network with a plurality of the gateway computers and a plurality of the wireless networks that are dispersed across a plurality of geographic locations, the server configured to aggregate the created data structures from the different wireless networks.

48. The system of claim 29, wherein the instructions are configured for execution on a server.

49. The system of claim 29, wherein the products comprise a plurality of electronic devices.

50. The system of claim 29, wherein the wireless nodes are located in a retail store.

\* \* \* \* \*